(12) United States Patent
Li et al.

(10) Patent No.: US 10,328,913 B2
(45) Date of Patent: Jun. 25, 2019

(54) FACILITATION OF AUTOMATIC ADJUSTMENT OF A BRAKING SYSTEM

(71) Applicant: International Business Machines Corporation, Armonk, NY (US)

(72) Inventors: Qi Cheng Li, Beijing (CN); Jie Ma, Nanjing (CN); Li Jun Mei, Beijing (CN); Xin Zhang, Beijing (CN); Xin Zhou, Beijing (CN)

(73) Assignee: INTERNATIONAL BUSINESS MACHINES CORPORATION, Armonk, NY (US)

( * ) Notice: Subject to any disclaimer, the term of this patent is extended or adjusted under 35 U.S.C. 154(b) by 246 days.

(21) Appl. No.: 15/355,724

(22) Filed: Nov. 18, 2016

(65) Prior Publication Data

US 2018/0141526 A1 May 24, 2018

(51) Int. Cl.
*B60T 7/04* (2006.01)
*B60T 8/172* (2006.01)

(52) U.S. Cl.
CPC ............. *B60T 8/172* (2013.01); *B60T 7/04* (2013.01); *B60T 7/042* (2013.01); *B60T 2270/86* (2013.01)

(58) Field of Classification Search
None
See application file for complete search history.

(56) References Cited

U.S. PATENT DOCUMENTS

| 9,248,819 | B1 | 2/2016 | Tan | |
| 2007/0112537 | A1* | 5/2007 | Gronau | B60T 8/36 |
| | | | | 702/105 |
| 2007/0213911 | A1* | 9/2007 | Trombley | B60T 8/17558 |
| | | | | 701/70 |
| 2010/0121548 | A1* | 5/2010 | Muller; Jochen | B60T 8/36 |
| | | | | 701/77 |
| 2011/0297493 | A1* | 12/2011 | Vollert | B60T 7/042 |
| | | | | 188/106 R |
| 2012/0074770 | A1* | 3/2012 | Lee | B60T 8/172 |
| | | | | 303/20 |

(Continued)

FOREIGN PATENT DOCUMENTS

WO 2015134417 A1 9/2015

OTHER PUBLICATIONS

Mikami, et al., "Model Predictive Assisting Control of Vehicle Following Task Based on Driver Model," 2010 IEEE International Conference on Control Applications Part of 2010 IEEE Multi-Conference on Systems and Control Yokohama, Japan, Sep. 8-10, 2010, 6 pages.

*Primary Examiner* — Nicholas K Wiltey
(74) *Attorney, Agent, or Firm* — Amin, Turocy & Watson, LLP

(57) ABSTRACT

Systems and methods for facilitating an automatic adjustment of a braking system is provided. In one example, a computer-implemented method can comprise generating, by a system operatively coupled to a processor, a braking curve model based on braking usage pattern data corresponding to one or more vehicles. The computer-implemented method can also comprise adjusting, by the system, a supplemental braking component of the first vehicle based on a simulation of one or more braking components corresponding to the one or more vehicles, wherein the one or more braking components is represented by the braking curve model.

20 Claims, 17 Drawing Sheets

(56) References Cited

U.S. PATENT DOCUMENTS

| | | | |
|---|---|---|---|
| 2013/0344856 A1* | 12/2013 | Silver | H04M 1/72577 455/418 |
| 2014/0074345 A1* | 3/2014 | Gabay | G07C 5/008 701/31.4 |
| 2014/0200737 A1 | 7/2014 | Lortz et al. | |
| 2014/0343767 A1* | 11/2014 | Oswald | B60T 17/228 701/19 |
| 2015/0046060 A1 | 2/2015 | Nikovski et al. | |
| 2015/0134217 A1* | 5/2015 | Drewes | B60T 7/12 701/70 |
| 2015/0199905 A1* | 7/2015 | Hayee | G08G 1/22 701/118 |
| 2015/0232099 A1* | 8/2015 | Miller | B60W 10/18 701/70 |
| 2015/0291146 A1 | 10/2015 | Prakah-Asante et al. | |
| 2015/0308530 A1* | 10/2015 | Shin | B60T 7/042 701/70 |
| 2015/0329093 A1* | 11/2015 | Svensson | B60T 8/17616 701/74 |
| 2016/0059852 A1* | 3/2016 | Yamakado | B60W 40/107 701/41 |
| 2016/0086397 A1* | 3/2016 | Phillips | G07C 5/0808 701/32.4 |
| 2016/0214608 A1* | 7/2016 | Packwood-Ace | B60W 30/14 |
| 2016/0339886 A1* | 11/2016 | MacArthur | B60T 8/4081 |
| 2017/0080942 A1* | 3/2017 | Nakada | B60W 50/0097 |
| 2017/0082511 A1* | 3/2017 | Ostreicher | G01L 5/28 |
| 2017/0174198 A1* | 6/2017 | Eckert | B60T 13/74 |
| 2017/0369072 A1* | 12/2017 | Huber | B60W 50/0098 |
| 2017/0369073 A1* | 12/2017 | Huber | B60W 50/0098 |
| 2018/0010372 A1* | 1/2018 | Rucha | E05C 17/006 |
| 2018/0066753 A1* | 3/2018 | Zhao | B60L 15/2009 |
| 2018/0079375 A1* | 3/2018 | Cekola | B60Q 1/0094 |
| 2018/0126901 A1* | 5/2018 | Levkova | B60Q 9/00 |
| 2018/0126971 A1* | 5/2018 | Leiber | B60T 7/042 |
| 2018/0134269 A1* | 5/2018 | Monschein | B60T 8/171 |
| 2018/0135744 A1* | 5/2018 | Kuang | F16H 61/0213 |
| 2018/0141526 A1* | 5/2018 | Li | B60T 8/172 |
| 2018/0170326 A1* | 6/2018 | Wang | B60T 7/085 |

\* cited by examiner

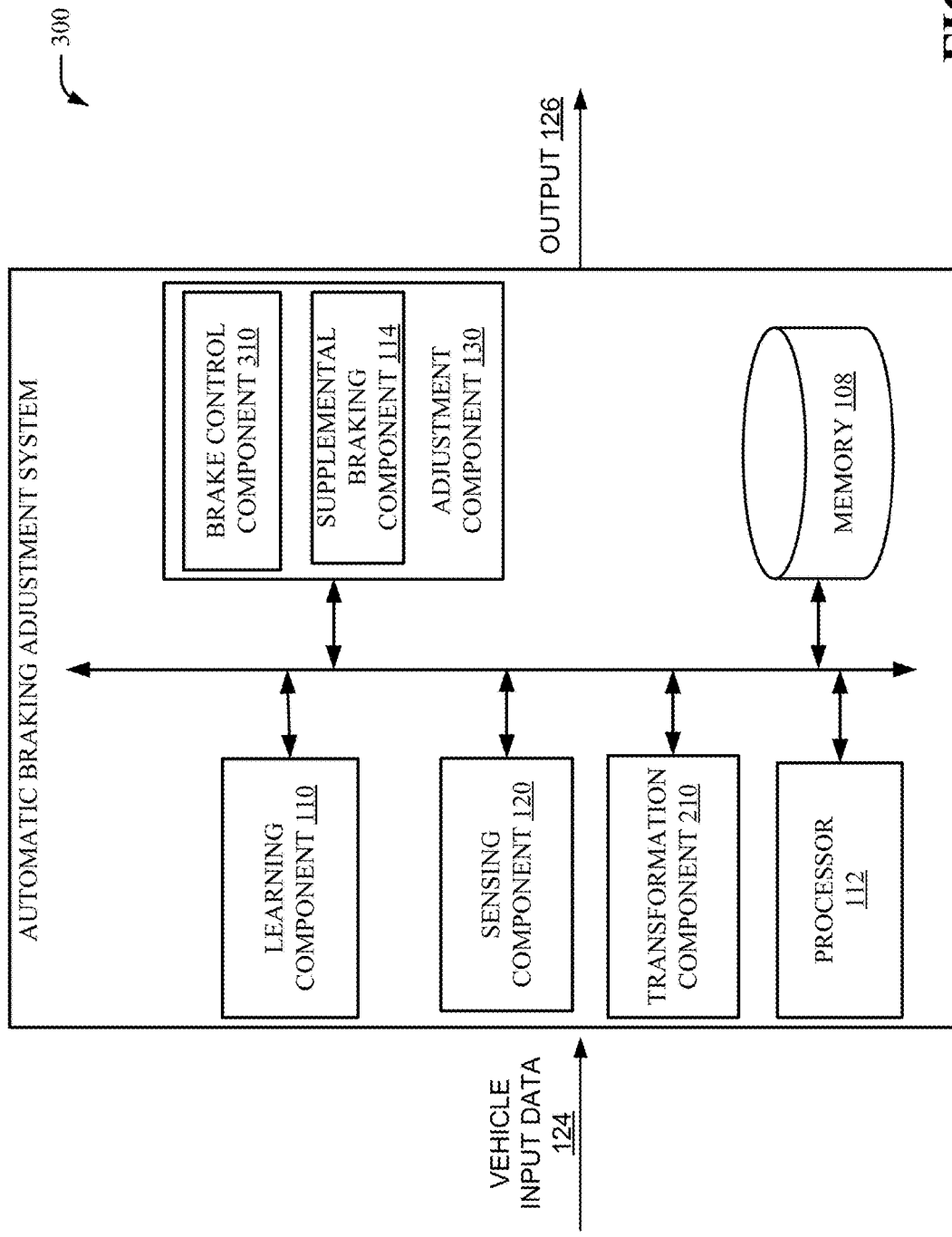

FACILITATION OF AUTOMATIC ADJUSTMENT OF A BRAKING SYSTEM

BACKGROUND

The subject disclosure relates to facilitating an automatic adjustment of a braking system.

SUMMARY

The following presents a summary to provide a basic understanding of one or more embodiments of the invention. This summary is not intended to identify key or critical elements, or delineate any scope of the particular embodiments or any scope of the claims. Its sole purpose is to present concepts in a simplified form as a prelude to the more detailed description that is presented later. In one or more embodiments described herein, systems, devices, apparatuses, and/or computer-implemented methods that facilitate automatically adjusting braking systems of various vehicles.

According to one embodiment, a computer-implemented method can generate, by a system operatively coupled to a processor, a brake curve model based on brake data from one or more vehicles; sensing, by the system, a condition corresponding to a first location of a first vehicle of the one or more vehicles; and adjusting, by the system, a supplemental braking component of the first vehicle based on the brake curve model.

According to another embodiment, a system comprising a memory that stores computer executable components; and a processor operably coupled to the memory and that executes the computer executable components stored in the memory are provided. The computer executable components comprise: a learning component that generates a brake curve model based on brake data from one or more vehicles; a sensing component that senses an condition corresponding to a first location of a first vehicle of the one or more vehicles; and an adjustment component that adjusts a supplemental braking component of the first vehicle based on the brake curve model.

According to yet another embodiment, a computer program product for facilitating an automatic adjustment of a braking system is provided. The computer program product can comprise a computer readable storage medium having program instructions embodied therewith, the program instructions executable by a processor to cause the processor to: generate a brake curve model based on brake data from one or more vehicles; sense a condition corresponding to a first location of a first vehicle of the one or more vehicles; and adjust a supplemental braking component of the first vehicle based on the brake curve model.

DESCRIPTION OF THE DRAWINGS

FIG. 3 illustrates a block diagram of an example, non-limiting system that can facilitate adjustment of a brake reaction control system of the first vehicle based on the defined braking criterion in accordance with one or more embodiments described herein.

DETAILED DESCRIPTION

The following detailed description is merely illustrative and is not intended to limit embodiments and/or application or uses of embodiments. Furthermore, there is no intention to be bound by any expressed or implied information presented in the preceding Background or Summary sections, or in the Detailed Description section.

The subject disclosure is directed to systems, devices, apparatuses, and/or computer-implemented methods that facilitate adapting a personalized braking system to a variety of vehicles in order to replicate a braking experience in a range of vehicles for a user. Currently, different vehicles possess differing brake systems that vary in several respects such as strength of brakes, effectiveness of the braking mechanism in different environmental conditions, required pressure to apply to the brake pedal to achieve a result, and other such characteristics. As such, a driver whom changes cars often (e.g., a rental car consumer, a taxi driver, etc.) can find that adjusting to different vehicle braking systems burdensome, arduous, and/or time consuming.

Accordingly, disclosed herein is a system to resolve the issues presented by switching vehicles and the need to learn the characteristics of a new brake system of such vehicle. Thus, the disclosed systems and methods facilitate the learning of user braking characteristics associated with a user's use of a vehicle braking system. The learned braking characteristic can be mapped to a corresponding braking system of another vehicle. As such, the user can operate another vehicle that is the same or different vehicle type (e.g., make, model, year, etc.) than the vehicle the user is accustomed to driving and have a familiar braking experience despite the weather conditions, type of car, and other differences in vehicles.

One or more embodiments are now described with reference to the drawings, wherein like referenced numerals are used to refer to like elements throughout. In the following description, for purposes of explanation, numerous specific details are set forth in order to provide a more thorough understanding of the one or more embodiments. It is evident, however, in various cases, that the one or more embodiments can be practiced without these specific details.

Figure 1A:
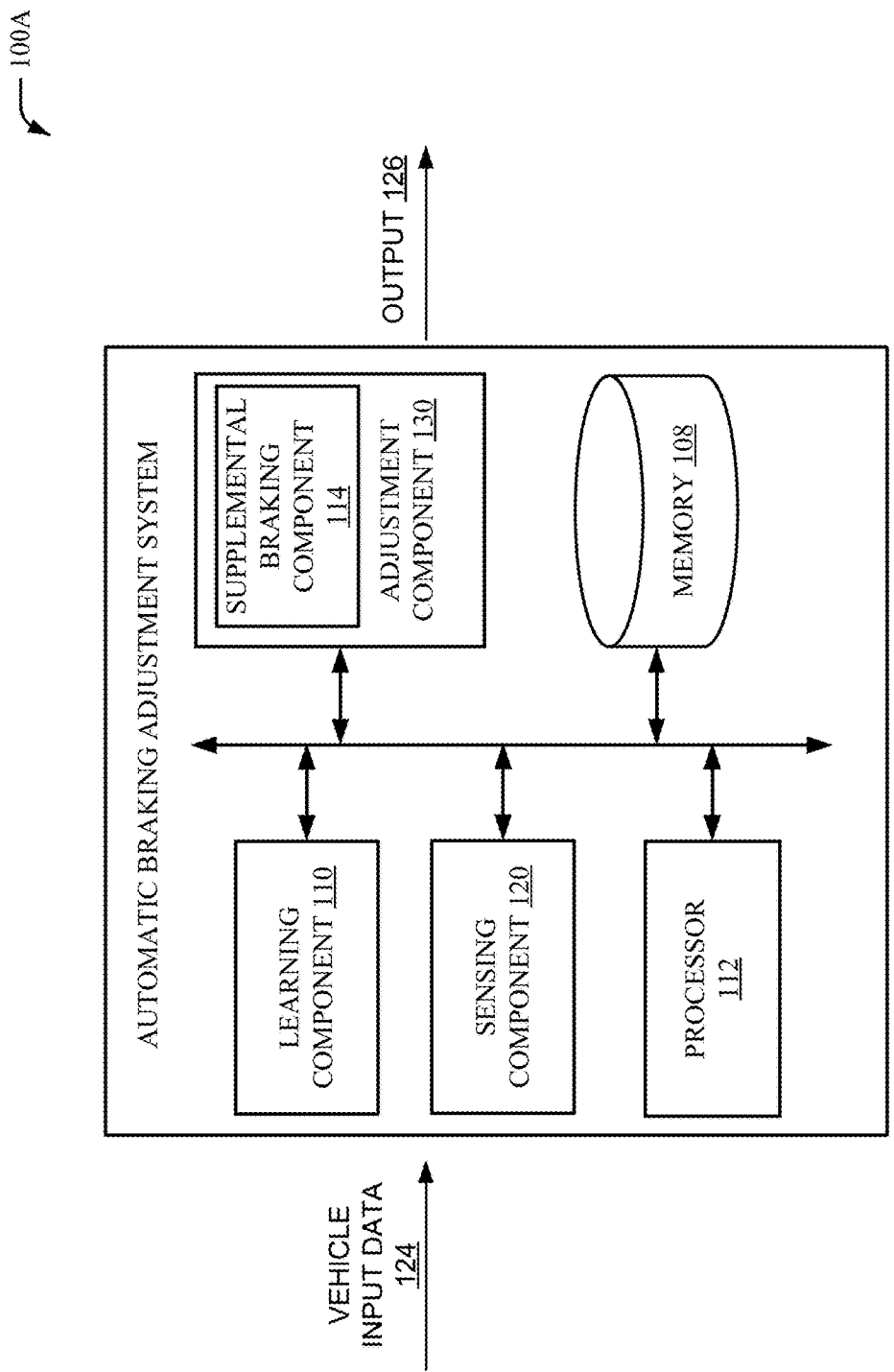
FIG. 1A illustrates a block diagram of an example, non-limiting system that can facilitate an adjustment of a supplemental braking component of a vehicle in accordance with one or more embodiments described herein.

FIG. 1A illustrates a block diagram of an example, non-limiting system 100A that can facilitate an adaptation of a personalized braking system to a variety of vehicles in order to replicate a braking experience in a range of vehicles for a user in accordance with one or more embodiments described herein.

In various non-limiting embodiments, system 100A can be associated with or included in a vehicle processing system, a brake adjustment system, a data analytics system, a data processing system, a graph analytics system, a graph processing system, a big data system, a social network system, a speech recognition system, a graphical modeling system, a data compression system, an artificial intelligence system, a machine-learning system, an authentication system, a syntactic pattern recognition system, a network system, a computer network system, a communication system, a router system, a server system or the like.

Aspects of systems (e.g., system 100A and the like), apparatuses, or processes explained in this disclosure can constitute machine-executable component(s) embodied within machine(s), e.g., embodied in one or more computer readable mediums (or media) associated with one or more machines. Such component(s), when executed by the one or more machines, e.g., computer(s), computing device(s), virtual machine(s), etc. can cause the machine(s) to perform the operations described herein.

As shown in FIG. 1A, illustrated is a block diagram of an example, non-limiting system 100A that can facilitate an adjustment of a supplemental braking component of a vehicle in accordance with one or more embodiments described herein. In an aspect, system 100A that can comprise a learning component 110 that generates a brake curve model based on brake data from one or more vehicles, a sensing component 120 that senses an condition corresponding to a first location of a first vehicle of the one or more vehicles, output 126 that can be generated in a vehicle based on an implemented braking curve model, and an adjustment component 130 that adjusts a supplemental braking component 114 of the first vehicle based on the brake curve model. The system components can also include or otherwise be associated with at least one processor 112 that can execute the computer executable components and/or computer instructions stored in memory 108. In an aspect, the learning component 110 can generate a brake curve model and store the brake curve model in memory 108 based on brake data; a non-limiting example of vehicle input data 124, from one or more vehicles. In an aspect, learning component 110 can learn a braking effect from the performance of one or more vehicle car brake. The learning component 110 can generate a brake curve model, stored in memory 108, as an output 126 based on the learned braking effect performance of such vehicles. In some embodiments, the output 126 can be represented by a braking model that depicts the braking strength required of a vehicle braking system as compared to respective braking forces applied to a front set of vehicle wheels and/or a back set of vehicle wheels. Thus, output 126 represents data associated with a first vehicle braking performance that can be implemented within a second vehicle to replicate such first vehicle braking performance. For instance, in a vehicle that requires an increase of braking strength to achieve a full stop by a braking system, the pre-braking force applied to the front wheels of the vehicle can be larger than the pre-braking force applied to the back wheels of the vehicle.

Figure 1B:
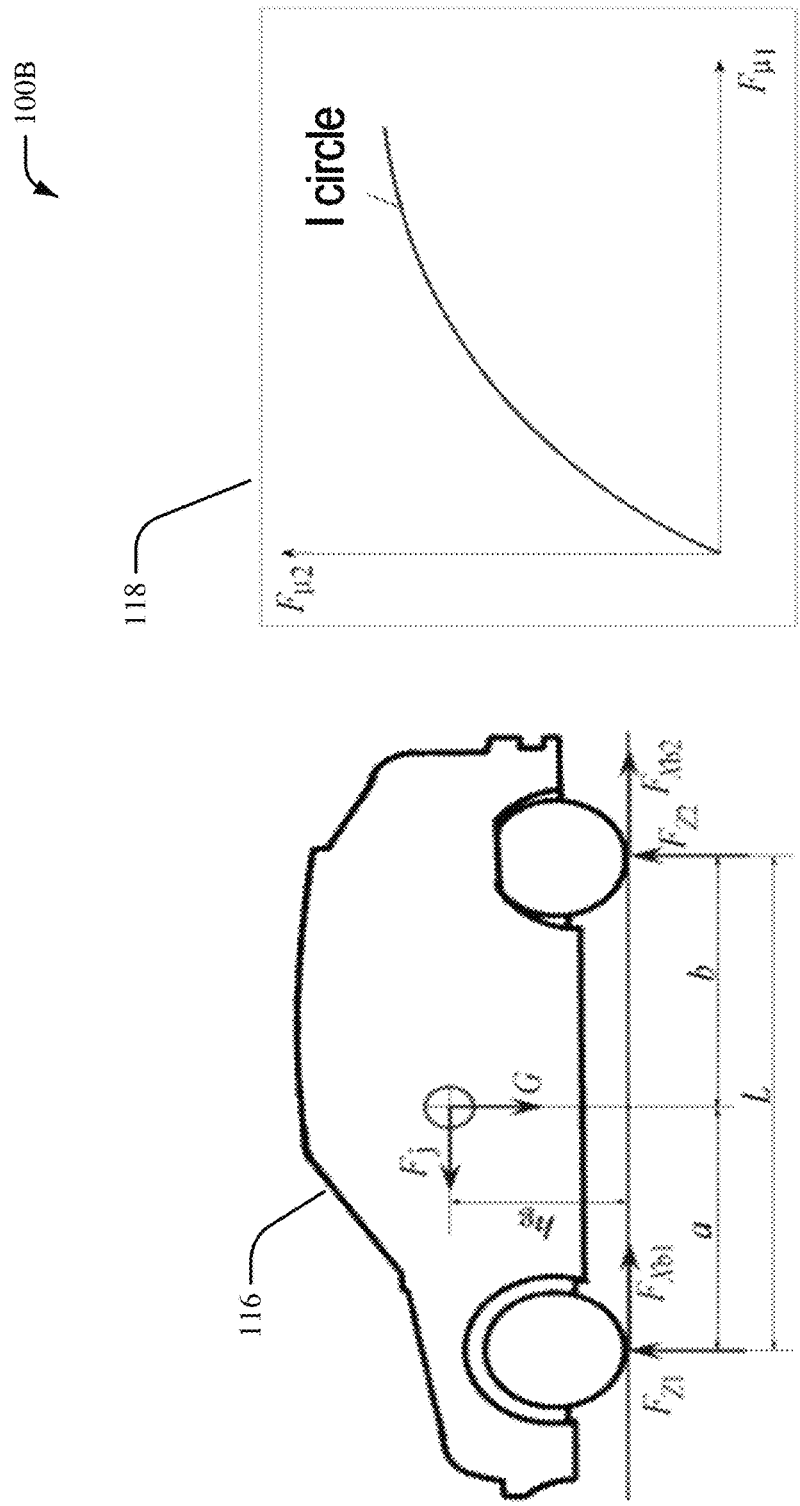
FIG. 1B illustrates a non-limiting example diagram of forces associated with a braking vehicle and a braking curve comparing the relationship between two braking forces during a vehicle braking operation in accordance with one or more embodiments described herein.

FIG. 1B illustrates a non-limiting example diagram 100B of forces associated with a braking vehicle 116 and a braking curve 118 comparing the relationship between two braking forces during a vehicle braking operation in accordance with one or more embodiments described herein. As an example, diagram 100B illustrates an example, non-limiting braking vehicle 116 diagram that depict various forces acting upon a vehicle during the process of braking and a curve comparing two forces respectively in accordance with one or more embodiments described herein. At reference numeral 116, a vehicle and various forces acting upon the vehicle during braking are identified, such forces include a ground reaction force Fz1 applied to the front wheels of the vehicle and a reaction force Fz2 applied to the rear wheels of the vehicle. Another set of forces include a horizontal forces Fxb1 and Fxb2 which occur perpendicular to the front and back wheels respectively. Furthermore, a gravitational force G also acts upon the vehicle where such force applies downward on the vehicle.

In an aspect, as a braking strength of a vehicle increases, the reaction force Fz2 applied to the back wheel of the vehicle decreases. Thus, the brake curve model generated by learning component 110 can indicate that by increasing the braking strength applied to the vehicles braking system as compared to the braking strength of the default braking system absent a brake curve implementation by system 100A, the ground reaction force Fz1 applied to the vehicle front wheels increases in relation to a default braking strength, while the ground reaction force Fz2 applied to the vehicle back wheels is decreasing. Accordingly, learning component 110 can generate braking curve models that depict braking characteristics of a range of vehicles.

Also, at reference numeral 118 is an illustration of a non-linear I circle curve 118 which represents a distribution of forces between a front braking force Fu1 of a front brake and a rear braking force Fu2 of a rear brake of a vehicle. The objective of the curve is to plot the relationship between the front braking force Fu1 applied to a vehicle front wheels as compared to the rear braking force Fu2 applied to a vehicle during the process of increasing a braking strength in a vehicle. The I circle curve 118 is not linear, which indicates that the front braking force Fu1 is greater than the rear braking force Fu2 because as a braking strength increases, the ground reaction force Fz1 as applied to the front wheels of a vehicle increases. Furthermore, in an aspect, the ground reaction force Fz2 as applied to the rear wheels of the vehicle is reduced. Thus, as a vehicle braking strength increases, the front braking force Fu1 as applied to the front wheels is greater than that of the rear braking force Fu2 as applied to the rear wheels of a vehicle. Accordingly, learning component 110 can generate braking curve models that accommodate such braking force details. Also, various braking curve models can be generated and selected for implementation in another vehicle based on a desired performance target of the another vehicle. For instance, a first vehicle can employ a braking model that allows for the front braking force Fu1 to be equal to the rear braking force Fu2. However, a second vehicle can can achieve the outcome presented in the I circle curve 118 by implementing the I circle curve 118 in the second vehicle where the desired outcome of the vehicle is for the front braking force Fu1 to be greater than the rear braking force Fu2.

Furthermore, a variety of braking models can be selected for implementation in another vehicle using system 100A. For instance, the learning component 110 can generate braking curve models, that can be stored in memory 108, that depict braking activities in several scenarios such as vehicle braking patterns in various environmental conditions. In an aspect, the braking curve model, that can be stored in memory 108, can be a curve that represents a braking effect outcome resulting from the application of various pressure amounts to a braking panel. Thus, in different environmental conditions, the braking pressure amounts required for application to a brake pedal in order to achieve a target braking result can vary. As such, multiple braking curves, that can be stored in memory 108, can be generated for different environmental conditions. Also, these braking curve models can be utilized by other braking systems to simulate the braking experience of a first vehicle in a different second vehicle by a user. For instance, a user in a sedan can have a first braking experience represented by a braking curve and such braking curve can be utilized to adjust a braking system of a sports utility vehicle (SUV) such that a user can simulate the same sedan braking experience in the SUV. In some embodiments, the braking experience of one car can also be implemented in another car that is the same vehicle (e.g., make, model, year, etc.) as the vehicle selected for simulation.

In another aspect, system 100A can employ a sensing component 120 that can sense an condition corresponding to a first location of a first vehicle of the one or more vehicles. The sensing component 120 can employ various sensors such as speed sensors (e.g., sensors that can measure a vehicle speed), acceleration sensors (e.g., sensors that can measure an acceleration speed when a vehicle is approaching a stop), gyroscopes (e.g., sensors that can measure an orientation and/or rotation of the vehicle or vehicle components), brake pedal force sensors (e.g., sensors that can measure the amount of pressure received by a brake pedal), humidity sensors (e.g., sensors that can quantify the potential effect of humidity on a tires on a vehicle), wind sensors (e.g. sensors that can correlate a defined braking distance to achieve a stop of the vehicle given a wind speed applied to the vehicle), temperature sensors, and other such sensors related to the braking system of a vehicle. In an aspect, braking systems can operate differently in different environmental conditions.

For instance, when road conditions are slippery, a braking system can require greater pressure to be applied to a brake pedal as compared to non-slippery road conditions in order to achieve a full stop of a vehicle. Furthermore, a braking system can require an increase in pressure to be applied to a brake pedal when a vehicle attempts to stop while travelling downhill. In another aspect, a braking distance required to stop a vehicle within a certain target distance during snowy conditions can require an application of greater pressure to be applied to a brake pedal, while under dry conditions, the application of less pressure can be applied to a brake pedal to achieve a stopping of the vehicle within a particular distance of an object. As such, the sensing component 120 can utilize sensed data and/or information to facilitate adjustment of a braking system in a vehicle. For instance, system 100 can utilize precipitation data sensed by a precipitation sensor to determine whether to adjust increase or decrease the pressure to be applied to the vehicle brake pedal in order to achieve a target distance when stopping during various weather conditions related to respective precipitation levels.

Accordingly, the sensing component 120 can utilize a set of sensors associated with the vehicle to sense an environmental condition that may impact a vehicle. Furthermore, the sensing component 120, by sensing various conditions associated with the vehicle, can enable system 100A to utilize other components (e.g., adjustment component 130) to adjust a vehicle supplemental braking component 114 based on such sensed environmental conditions. Furthermore, in an aspect, the sensing component 120 in connection with learning component 110 can utilize an appropriate braking curve model based on a sensed environmental condition to facilitate a proper adjustment of a supplemental braking component 114 by adjustment component 130.

In another aspect, system 100A can employ adjustment component 130 to adjust a supplemental braking component 114 (Please see paragraphs below for brake control component 310 description) of the first vehicle based on a defined braking criterion. For instance, in various embodiments, a defined braking criteria can include a preferred brake pedal push power required to achieve a respective braking effect, a target braking distance to be achieved by implementing a braking system within a vehicle, and/or a target force to be applied to a front wheel and/or rear wheel of a vehicle given an application of a desired braking strength to achieve within a vehicle. The braking systems of vehicles can differ based on a variety of mechanical and structural differences in each vehicle. As such, the adjustment component 130 can adjust a supplemental braking component 114 of a different vehicle in accordance with a braking curve model generated (e.g., generated by learning component 110) from data corresponding to use of the vehicle sought for simulation, the nature and/or state of the braking system and/or a sensed (e.g., using sensing component 120) environmental condition surrounding the vehicle.

Figure 1C:
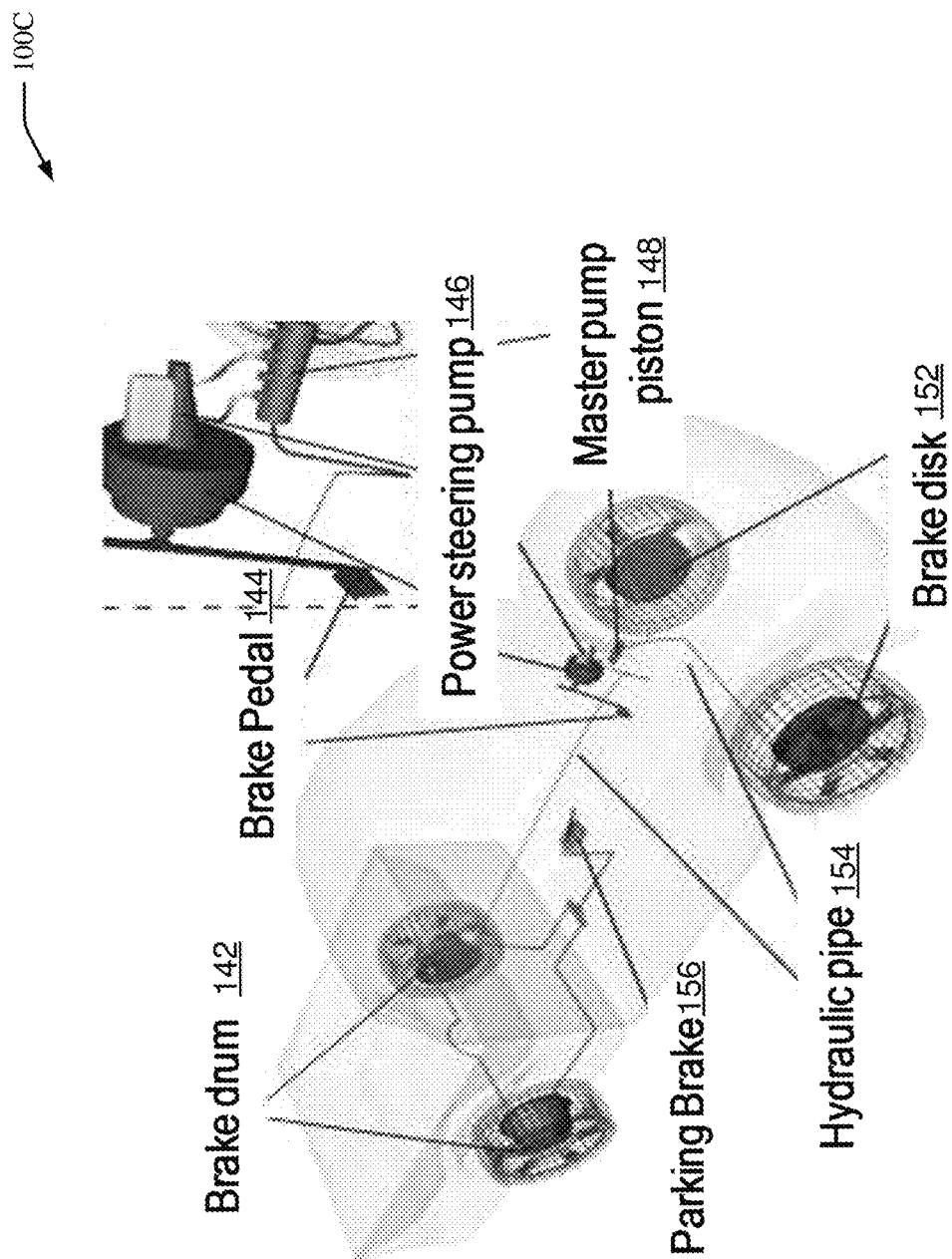
FIG. 1C illustrates a non-limiting example diagram of a vehicle and various elements of a vehicle braking mechanism in accordance with one or more embodiments described herein.

FIG. 1C illustrates a non-limiting example diagram of a vehicle 100C and various elements of a vehicle braking mechanism in accordance with one or more embodiments described herein. In an aspect, adjustment component 130 in connection with brake control component 310 (an example of which will be described in more detail with reference to FIG. 3) can adjust vehicle components illustrated at vehicle 100C in order to replicate a personalized braking experience in a different vehicle, where such braking components can include, but are not limited to, a brake drum 142, a brake pedal 144, a parking brake 156, a hydraulic pipe 154, a power steering pump 146, a master pump piston 148, and/or a brake disk 152. Furthermore, the adjustment component 130 can adjust various braking characteristics to simulate a personalized user braking experience in a different vehicle than a user may typically drive. For instance, adjustment component 130 can adjust the amount of pressure required to apply to a brake pedal to achieve a particular braking result (e.g., add/reduce required foot push power to a pedal), the amount of resistance to provide by a brake pedal to achieve a particular braking result, the amount of force to apply, in order to achieve a braking effect given a desired braking distance.

Thus, the adjustment component 130 can adjust a vehicle's control unit or respective brake control components to achieve a simulated braking effect of a vehicle based on a generated braking curve model (e.g., generated using learning component 110) and given sensed environmental conditions (e.g., sensed using sensing component 120).

Figure 1D:
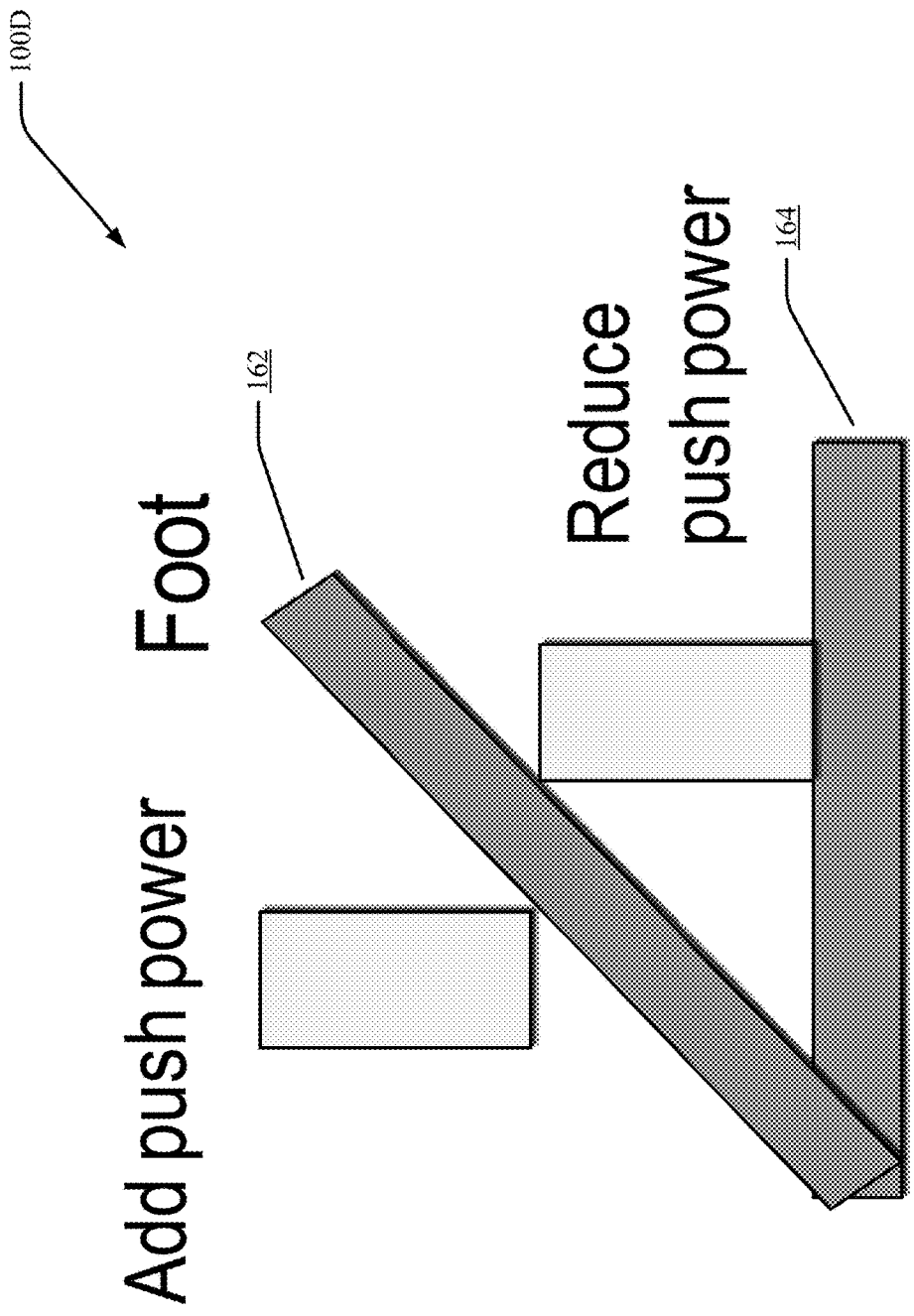
FIG. 1D illustrates a non-limiting example diagram of an adapted vehicle brake pedal in accordance with one or more embodiments described herein.

FIG. 1D illustrates a non-limiting example diagram of an adapted vehicle brake pedal system 100D in accordance with one or more embodiments described herein. In an aspect, the brake pedal system 100D that can be adjusted to facilitate an adaptation of a personalized braking system to a variety of vehicles in order to replicate a braking experience in a range of vehicles for a user in accordance with one or more embodiments described herein.

As depicted in brake pedal system 100D, reference numeral 162 refers to the brake pedal portion of a vehicle braking system, where brake pedal portion 162 is configured to receive a user foot and/or user heel and reference numeral 164 refers to a portion of a vehicle ground or floor. In an aspect, adjustment component 130 can add a required amount of push power necessary to move the brake pedal portion 162 toward vehicle floor 164. In another aspect, adjustment component 130 can reduce the amount of push power required for application to the brake pedal portion 162 to move brake pedal portion 162 closer towards the vehicle floor 164.

Figure 2A:
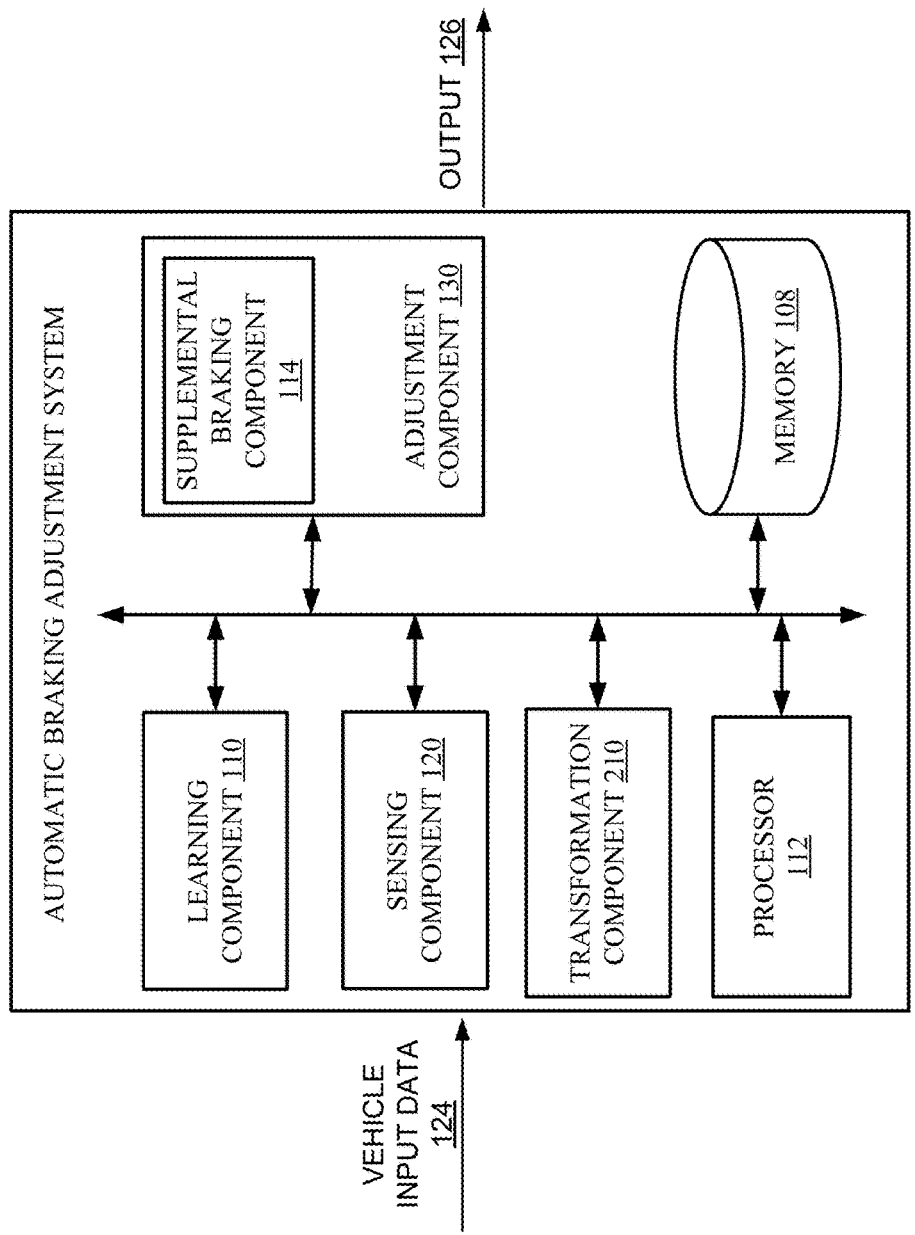
FIG. 2A illustrates a block diagram of an example, non-limiting system that can facilitate a transformation of a brake curve from a brake curve to a transformed brake curve in accordance with one or more embodiments described herein.

FIG. 2A illustrates a block diagram of an example, non-limiting system 200A that can facilitate a transformation of a brake curve from a brake curve to a transformed brake curve in accordance with one or more embodiments described herein. In an aspect, system 200A depicts a personalized braking system that can be adapted to a variety of vehicles and that can generate a vehicle braking effect output 126 based on an implemented braking curve model, for implementation of braking models in respective vehicles in order to replicate a user braking experience in such vehicles in accordance with one or more embodiments described herein. Repetitive description of like elements employed in other embodiments described herein are omitted for sake of brevity.

In a non-limiting embodiment, system 200A can comprise learning component 110, sensing component 120, adjustment component 130, and transformation component 210 that can transform a brake curve from a first brake curve to a transformed brake curve that can facilitate an adjustment of the supplemental braking component 114. In some embodiments, the transformed brake curve can represent an adjusted version of the first vehicle brake curve. In an aspect, transformation component 210 can transform a braking curve between different vehicles. For instance, a braking curve for a first vehicle can be selected and represented by a first braking curve, that can be stored in memory 108, and a braking curve for a second vehicle can be selected and represented by a second braking curve, that can be stored in memory 108, and that can be shifted lower on the Y-axis than the first braking curve.

The transformation component 210 can bridge the gap between the first braking curve and the second braking curve in order to adjust braking characteristics of the second vehicle to simulate the braking characteristics of the first vehicle. For example, the braking curve can plot a brake pedal force on the x-axis and the actual braking effect on the y-axis given an applied brake pedal force. The brake pedal force can represent the amount of pressure required by the brake pedal to achieve a target braking effect.

In an aspect, if according to the brake curve, there exists differences between the first vehicle and the second vehicle braking systems such that more pressure must be applied to the brake pedal of the second vehicle to achieve the same braking effect result achieved in the first vehicle but with less applied pressure, then transformation component 210 can bridge the gap between the curves. The term bridging the gap can refer to implementing a braking mechanism that adjusts a brake pedal force and/or a brake pedal angle speed of a vehicle braking system in order to achieve vehicle braking results associated with a braking curve other than a default braking curve of a vehicle.

Thus, the process of bridging the gap can include selecting and comparing characteristics of two vehicles braking systems and determining whether a difference in such braking system characteristics exist. For instance, if a first vehicle requires more force to be applied to a brake pedal than a second vehicle to achieve the same braking effect (e.g., coming to a full stop within 10 feet of an object), then transformation component 210 can bridge the gap by selecting the corresponding characteristic data for the first and second vehicle and comparing the differences in braking system characteristics of the first vehicle and the second vehicle. In response to the selection, comparison and determined discrepancy in forces required for application of a braking pedal to achieve a target result, the transformation component 210 can adjust the braking system by outputting a direction to the braking system to adjust the amount of pressure (e.g., increase the force required to be applied to the brake pedal in the second vehicle to achieve the same result achieved in the first vehicle) required for application to a brake pedal to achieve a target result. The differences in comparisons between braking system characteristics can be represented by braking curves—an example of which will be described in more detail with reference to FIG. 2B.

As such, the transformation component 210, by bridging the gap between braking curves (e.g., the differences in area between curves when overlaid on the same graph) can transform the braking curve of the second vehicle to replicate the braking curve of the first vehicle. Accordingly, the adjustment component 130 can increase or decrease the amount of resistance provided by the brake pedal to simulate the same brake pedal force requirements of the first vehicle to achieve a target braking result. The term brake pedal force requirement can mean a force amount to be applied to a brake pedal in order to achieve a target braking effect. Thus, a user can selectively achieve a preferred braking setting in multiple user vehicles. In some embodiments, the vehicle can automatically increase or decrease pressure applied to the brake pedal greater than or less than that applied by a user based on a system determination.

In another aspect, transformation component 210 can transform the braking curve of a vehicle B to achieve the same (or approximately the same) results as a braking curve for a vehicle A by bridging a gap in the difference between curves, where the curve plots a brake pedal angle speed on the x-axis and an actual braking effect on the y-axis such that a vehicle B braking curve can achieve the same vehicle A braking curve. Thus, achieving the same results as a braking curve can refer to a first braking curve achieving the same x-axis value and the same y-axis value of a second different braking curve. In some embodiments, the brake pedal angle speed can be a characteristic that describes the speed at which a brake pedal moves upon applying a particular pressure to such pedal. The brake pedal angle is the angle between a brake pedal (e.g., portion where the user heel is located) and the ground of a vehicle (e.g., vehicle floor), which changes (e.g., the angle becomes smaller and larger) as pressure is applied and removed from the brake pedal. Furthermore, given a particular brake pedal speed, the vehicle can achieve a corresponding brake pedal effect. Thus, transformation component 210 in connection with adjustment component 130 can replicate a braking curve represented by a plot of data, that can be stored in memory 108, by comparing the brake pedal angle speed to an actual braking effect and adjustment component 130 can output a signal to adjust a braking system or supplemental braking component 114 to implement the braking curve adjustments in vehicle B.

Figure 2B:
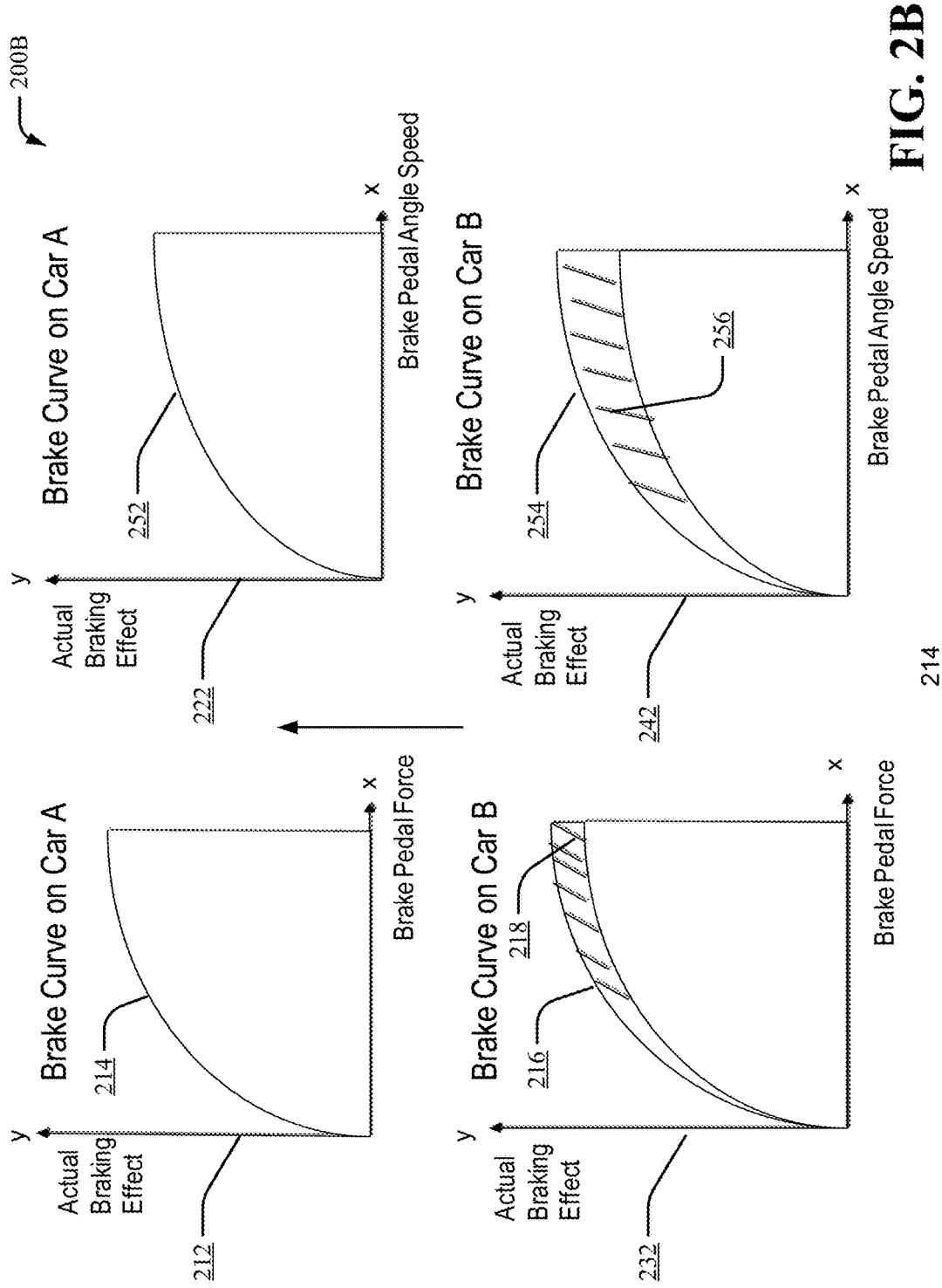
FIG. 2B illustrates several non-limiting example brake curves comparing brake pedal angle speeds and brake pedal forces to actual braking effects of respective vehicles in accordance with one or more embodiments described herein.

FIG. 2B illustrates several non-limiting example braking curves 200B comparing brake pedal angle speeds and brake pedal forces to actual braking effects of respective vehicles in accordance with one or more embodiments described herein. In an aspect, braking curves 200B depict comparisons of brake pedal forces and actual braking effects as well as brake pedal angle speed and actual braking effects in accordance with one or more embodiments described herein. As depicted, braking curve graph 212, illustrates a braking curve 214 of a first vehicle (e.g., referred to as car A) where the x-axis represents an increasing brake pedal force and the y-axis represents an actual braking effect. Braking curve graph 232, illustrates a braking curve 216 of a second vehicle (e.g., referred to as car B) where again, plotted on the x-axis is a brake pedal force and plotted along the y-axis is an actual braking effect. The shaded area 218 (also referred to herein as "the gap") at graph 232 represents the difference or gap between the braking curve 214 for car A at graph 212 and the braking curve 216 for car B at graph 232. In an aspect, transformation component 210 can transform the braking curve at reference numeral 232 to bridge the gap of shaded area 218 between the braking curve 216 at graph 232 and the braking curve 214 at graph 212.

Braking curve graph 222, illustrates a braking curve 252 of a first vehicle (e.g., referred to as car A) where plotted on the x-axis is a brake pedal angle speed and plotted along the y-axis is an actual braking effect. At reference numeral 242, illustrated is a braking curve of a second vehicle 254 (e.g., referred to as car A) where again, plotted on the x-axis is a brake pedal angle speed and plotted along the y-axis is an actual braking effect. The shaded area 256 at reference numeral 232 represents the difference or gap between the braking curve 252 at reference numeral 222 and the braking curve 254 at reference numeral 242. In an aspect, transformation component 210 can transform the braking curve 254 at reference numeral 242 to bridge the gap of shaded area 256 between the braking curve 254 at reference numeral 242 and the braking curve 252 at reference numeral 222. Accordingly, learning component 110 can generate a variety of braking curves based on different parameters. Furthermore, transformation component 210 can transform such braking curves such that a second vehicle can simulate the braking effects of a first vehicle.

FIG. 3 illustrates a block diagram of an example, non-limiting system 300 that can facilitate adjustment of a brake reaction control system of the first vehicle based on the defined braking criterion in accordance with one or more embodiments described herein. In an aspect, system 300 can facilitate an adaptation of a personalized braking system to a variety of vehicles in order to replicate a braking experience in a range of vehicles for a user in accordance with one or more embodiments described herein. Repetitive description of like elements employed in other embodiments described herein are omitted for sake of brevity.

In a non-limiting embodiment, system 300 can comprise learning component 110, sensing component 120, adjustment component 130, output 126 that can output a vehicle braking effect based on an implemented braking curve model, transformation component 210, and brake control component 310 that can adjust a vehicle component of the first vehicle based on the defined braking criterion. In an aspect, the brake control component 310 can utilize various braking curve information, that can be stored in memory 108, which can refer to user (past or preferred) brake pedal usage, data correlating brake pedal force levels and resulting braking effects, and data correlating applied brake pedal angle speeds and resulting braking effects to facilitate an adjustment of a vehicle braking system based on the defined braking criteria. The defined braking criteria can include a brake angle pedal speed or a brake pedal force requirement.

Furthermore, the adjustment of a vehicle component can include adjusting a braking component such as a brake drum 142 (e.g., adjusting the distance between the brake pedal prior to depressing the brake pedal 144 and the distance between the shoes and the brake drum), a brake pedal 144 (e.g., adjusting the resistance of the pedal), a hydraulic pipe 154 (e.g. adjusting the pressure within the hydraulic pipe 154), a power steering pump 146 (e.g., adjusting the resistance in a steering wheel), a master pump piston 148 (e.g., varying the comparative surface area of the master cylinder to vary the amount of force applied to each slave cylinder), and/or a brake disk 152 (e.g., adjusting one or more calipers to create friction variances and/or adjusting the rotational speed of the disk).

Figure 4A:
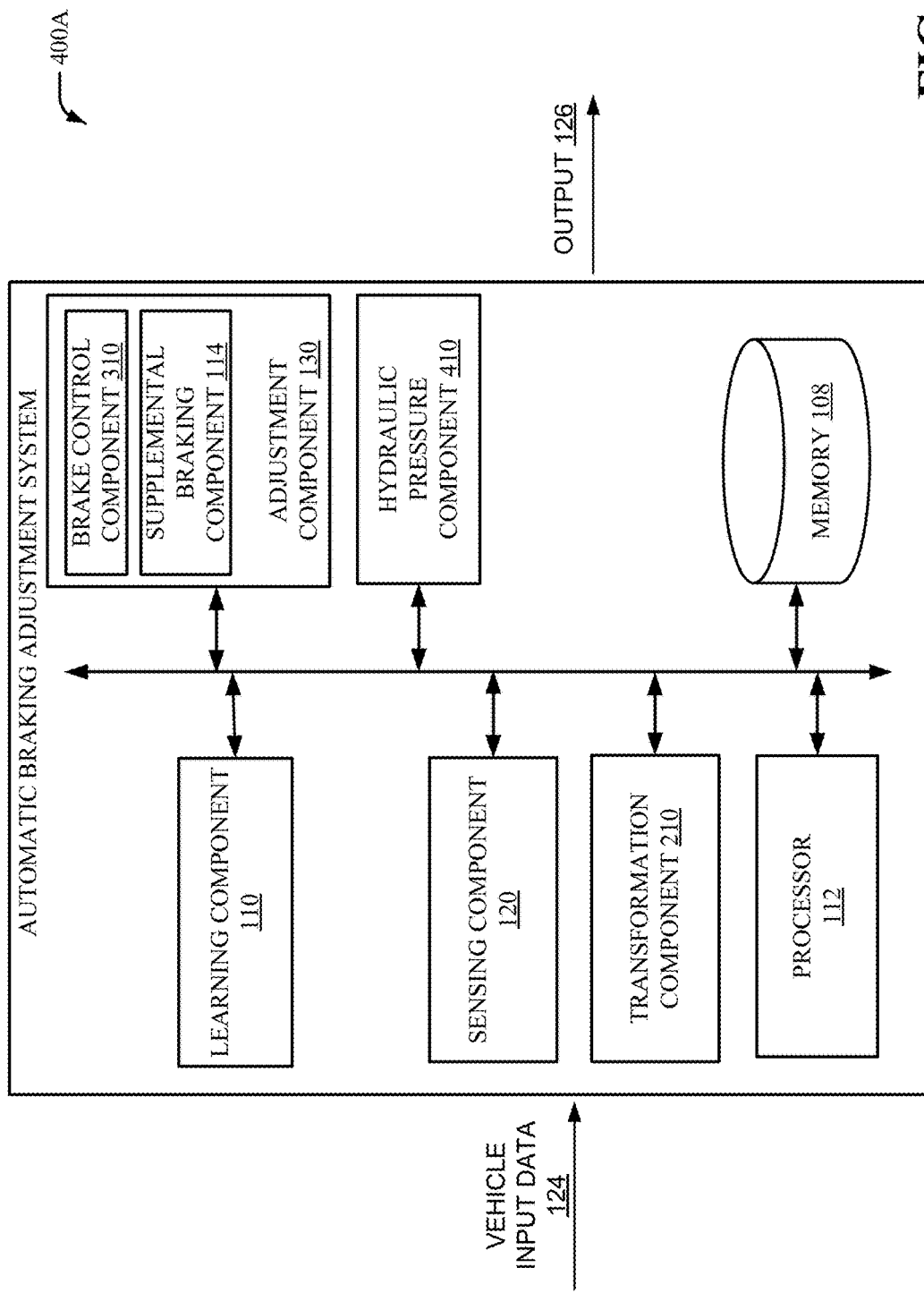
FIG. 4A illustrates a block diagram of an example, non-limiting system that can facilitate adjusting a force setting of a brake pedal of a vehicle in accordance with one or more embodiments described herein.

FIG. 4A illustrates a block diagram of an example, non-limiting system 400 that can facilitate adjusting a force setting of a brake pedal of a vehicle in accordance with one or more embodiments described herein. In an aspect, system 400 can facilitate an adaptation of a personalized braking system to a variety of vehicles in order to replicate a braking experience in a range of vehicles for a user in accordance with one or more embodiments described herein. In an aspect, system 400 can adapt a personalized braking system to a variety of vehicles in order to replicate a user braking experience in a range of vehicles in accordance with one or more embodiments described herein. Repetitive description of like elements employed in other embodiments described herein are omitted for sake of brevity.

In a non-limiting embodiment, system 400 can comprise learning component 110, sensing component 120, adjustment component 130, output 126 that can output a vehicle braking effect based on an implemented braking curve model, transformation component 210, brake control component 310, and hydraulic pressure component 410 coupled to a brake panel element of the first vehicle and that can adjust a force setting of a brake pedal of the first vehicle. Most vehicles utilize a hydraulic principle to facilitate braking, however, the hydraulic settings of each vehicle can vary. As such, the hydraulic pressure component 410 can adjust the settings and parameters in various vehicles to achieve the same braking effect as experienced in a target vehicle. Thus, in an aspect, the hydraulic pressure component 410 can adjust a braking mechanism that utilizes brake fluid to transfer pressure from a control component of the braking system to the braking mechanism of a vehicle.

For instance, the hydraulic pressure component 410 can adjust the pressure amount applied by a master piston to brake fluid pushed through a brake tube. By adjusting the braking mechanism, the hydraulic pressure component 410 can adjust a force setting of the brake pedal. A force setting can include a force with which a master piston applies to brake fluid in order to push such brake fluid through the brake tube. The brake fluid in turn transfers the force applied by the master piston into pressure in order to amplify or decrease a braking force applied to a vehicle.

In an aspect, the master cylinder piston connects the brake pedal to the brake control components (e.g., brake caliper, brake disc) of a braking system. The master cylinder piston can provide resistance to a brake pedal and the hydraulic pressure component 410 can facilitate an increase or decrease in pressure exerted within a pressure piston and accordingly the pressure (e.g., acting as resistance to a user pressing on the brake pedal) against a brake pedal. Furthermore, such increase or decrease in pressure can transfer to the brake pedal in order to provide an increase or decrease in a resistance level of the brake pedal. As such, a user can simulate the brake experience of a user in numerous vehicles because hydraulic pressure component 410 can adjust a brake pedal required force to achieve a braking result in accordance with a user preference. In yet another aspect, the hydraulic pressure component 410 can adjust the settings and parameters of braking systems that follow a lever principle mechanics to bring about a braking effect in braking systems.

Figure 4B:
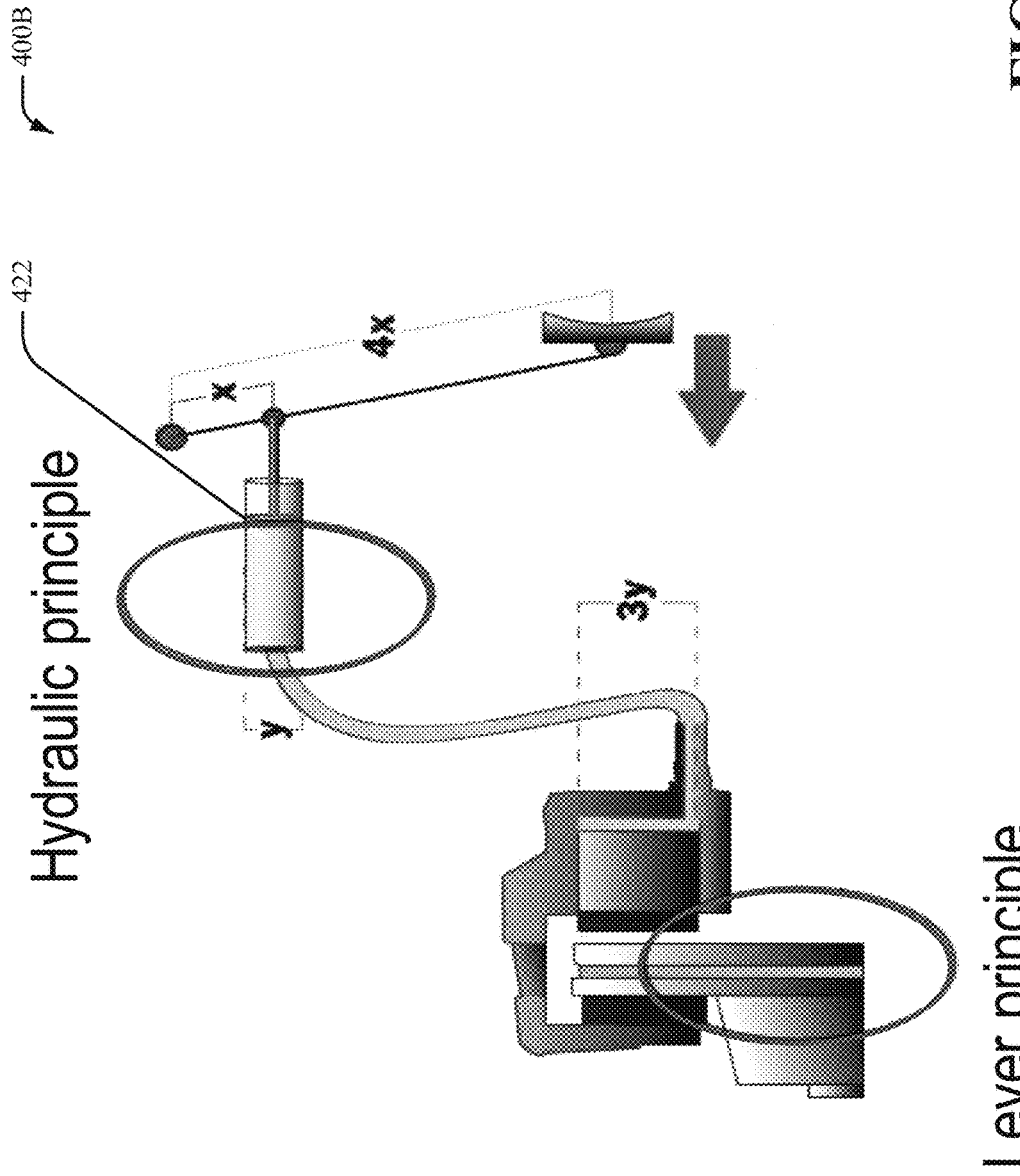
FIG. 4B illustrates a diagram of a non-limiting example of a hydraulic principle and lever principle of a vehicle braking mechanism in accordance with one or more embodiments described herein.

FIG. 4B illustrates a diagram of a non-limiting example hydraulic braking system 400B illustrating a hydraulic principle and lever principle of a vehicle braking mechanism in accordance with one or more embodiments described herein.

In an aspect, hydraulic braking system 400B which includes a master piston 422 that forces brake fluid along a pipe in accordance with one or more embodiments described herein. Repetitive description of like elements employed in other embodiments described herein are omitted for sake of brevity. In another aspect, the brake fluid, after being forced along a pipe by the master piston 422, travels to a slave cylinder at each wheel in order to fill up slave pistons located within the slave cylinder. As such the fluid applies pressure to the slave pistons forcing such pistons to apply braking pressure to the wheels (via a braking mechanism). As such the hydraulic braking principles that govern the relationship between the brake pedal and the hydraulic braking mechanism of a vehicle can be adjusted using the hydraulic pressure component 410.

Figure 5:
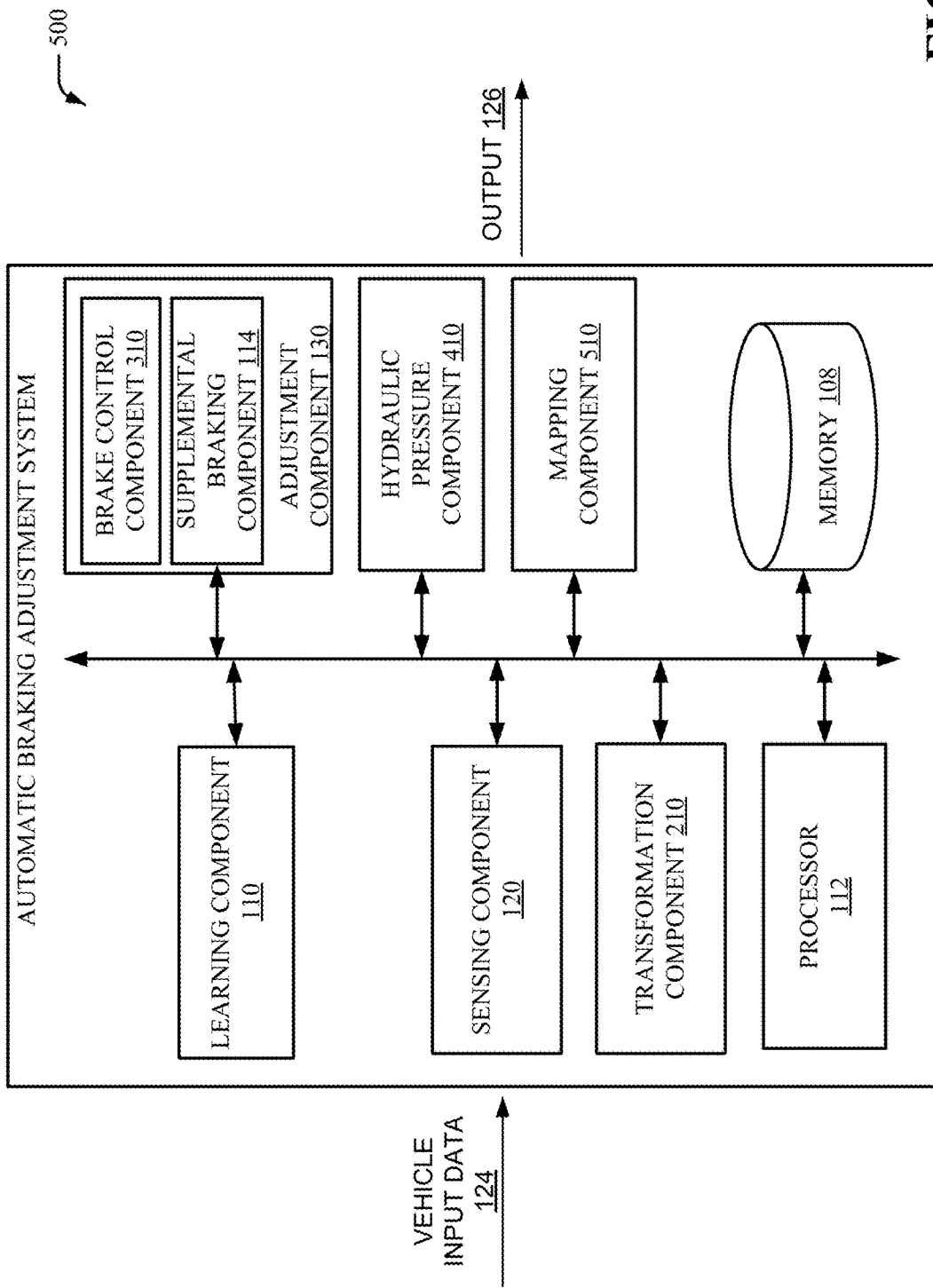
FIG. 5 illustrates a block diagram of an example, non-limiting system that can facilitate mapping a simulated braking component from the one or more vehicles to the first vehicle in accordance with one or more embodiments described herein.

FIG. 5 illustrates a block diagram of an example, non-limiting system 500 that can facilitate mapping a simulated braking component from the one or more vehicles to the first vehicle in accordance with one or more embodiments described herein. In an aspect, system 500 can facilitate an adaptation of a personalized braking system to a variety of vehicles in order to replicate a braking experience in a range of vehicles for a user in accordance with one or more embodiments described herein. Repetitive description of like elements employed in other embodiments described herein are omitted for sake of brevity.

In another aspect, system 500 facilitates an adaptation of a personalized braking system to a variety of vehicles in order to replicate a user braking experience in a range of vehicles in accordance with one or more embodiments described herein. Repetitive description of like elements employed in other embodiments described herein are omitted for sake of brevity.

In a non-limiting embodiment, system 500 can comprise learning component 110, sensing component 120, adjustment component 130, transformation component 210, brake control component 310, hydraulic pressure component 410, and mapping component 510 that can map a simulated braking component from the one or more vehicles to the first vehicle. In an aspect, mapping component 510 can map data associated with a learned braking curve to a range of vehicles. In an aspect, the mapping component 510 can utilize one or more curve fitting algorithms such as a least square curve fitting algorithm or a two curve fitting algorithm to facilitate generation of a curve to be implemented in a second vehicle but can represent a user braking patterns and/or braking preferences. The data mapping can occur by transferring data associated with a first braking curve of a first vehicle to a computing system of a second vehicle. In an aspect, the data can be mapped from a first vehicle to a second vehicle using a lookup table. For instance, the data associated with the first vehicle can be accessed from a lookup table stored in memory 108. The data can include brake pedal force data, actual braking effect data, and brake pedal angle force speed data. As such, the data of a first vehicle can be different than the data of the second vehicle based on a combination of data variables. For instance, brake pedal force data can represent the amount of force needed to apply to a brake pedal in order to achieve a particular result. However, the first vehicle may have a hydraulic braking mechanism that requires less force to bring about a braking effect than the second vehicles force requirement on the brake pedal to achieve the same result where the second vehicle does not have a hydraulic braking mechanism.

Also, other variables can contribute to a difference in data between a first vehicle and a second vehicle, such as a vehicle type, a vehicle's weight, a vehicle's tire size, and a makeup of a vehicles supplemental braking component 114. Accordingly, the correlations between a brake pedal force required to achieve a desired braking effect and between a brake pedal angle speed to achieve a desired braking effect can be different in each vehicle based on differing variables. As such, mapping component can utilize the data (e.g. located in lookup tables) corresponding to such variables and map data from one variable to another variable to facilitate the achievement of a particular result occurring in a first vehicle in a second vehicle as well.

As an example, data associated with the force required for application to a brake pedal in a first vehicle that uses a hydraulic brake mechanism for braking can be mapped (e.g., using mapping component 510) to a lookup table in a second vehicle that does not use a hydraulic brake mechanism. The mapped data can include the force data requirements from the first vehicle but can also be adjusted to account for the variable in the second vehicle of not having a hydraulic brake mechanism. Thus, the mapped force data can be used to adapt the brake pedal force characteristics in a vehicle that does not utilize a hydraulic based braking mechanism.

The data mapping can also include the mapping of data corresponding to a transformed brake curve (e.g. using transformation component 210) from a first vehicle to a second vehicle. Thus the mapping component 510 can transfer data stored in a system memory (e.g., using a data table) of a first vehicle to a system memory of a second vehicle. The mapped data can correspond to correlations between brake pedal forces and vehicle braking effects as well as correlations between brake pedal angle speeds and vehicle braking effects. Accordingly, mapping component 510 can facilitate the transfer of braking characteristics customized to a user from one vehicle to another vehicle.

Figure 6:
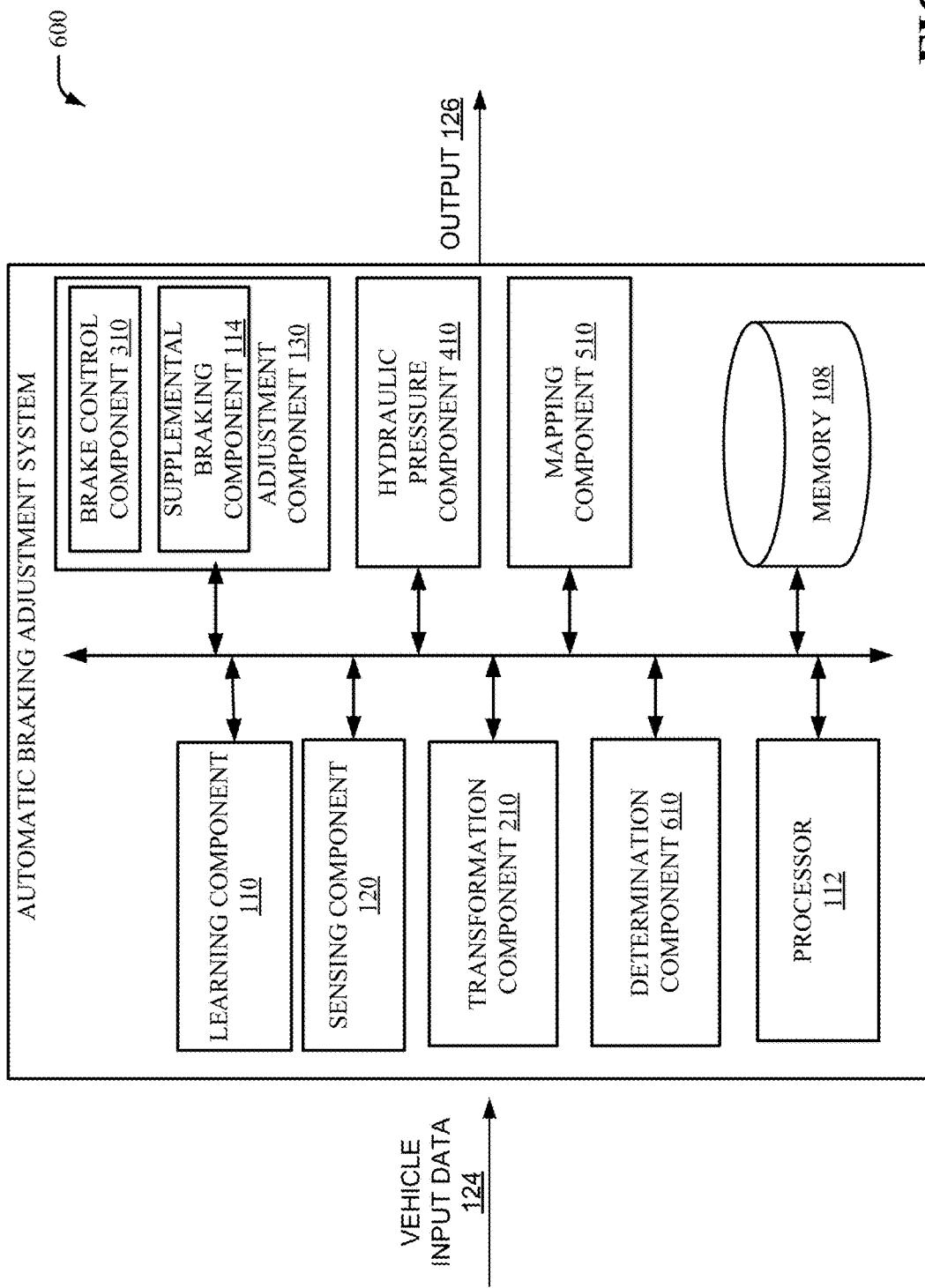
FIG. 6 illustrates a block diagram of an example, non-limiting system that can facilitate a measuring of a gap between a personalized braking model and an actual braking effect model in accordance with one or more embodiments described herein.

FIG. 6 illustrates a block diagram of an example, non-limiting system 600 that can facilitate a measuring of a gap between a personalized braking model and an actual braking effect model in accordance with one or more embodiments described herein. In an aspect, system 600 can facilitate an adaptation of a personalized braking system to a variety of vehicles in order to replicate a braking experience in a range of vehicles for a user in accordance with one or more embodiments described herein. Repetitive description of like elements employed in other embodiments described herein are omitted for sake of brevity.

In a non-limiting embodiment, system 600 can comprise learning component 110, sensing component 120, adjustment component 130, transformation component 210, brake control component 310, hydraulic pressure component 410, mapping component 510, and determination component 610 that can determine a measurement of a gap between a personalized braking model and an actual braking effect model to facilitate generation of the brake curve model. In an aspect, the determination component 610 can measure the gap between brake curves of a first vehicle and a second vehicle.

The brake curves can correspond to a brake pedal force measurement parameter, a brake pedal angle speed measurement parameter, and actual braking effects given each respective parameter. Accordingly, by determining a gap between curves of a first vehicle and a second vehicle, the determination component 610 in connection with transformation component 210 can facilitate a transformation (e.g., using transformation component 210) of a brake curve from a first vehicle to a brake curve of a second vehicle that simulates the braking of the first curve.

The simulation of a braking curve of a first vehicle in a second vehicle can result in the ability to apply the same force to a brake pedal in the second vehicle that they would in the first vehicle and achieve the same braking effect in both vehicles (e.g., same braking distance, time to fully brake, etc.). Thus, system 600 facilitates the unification of forces employed to bring about a braking effect in the first vehicle and the second vehicle. In an aspect, a user can also select whether to use an adjusted braking system setting or an unadjusted braking system setting when operating a vehicle.

Figure 7:
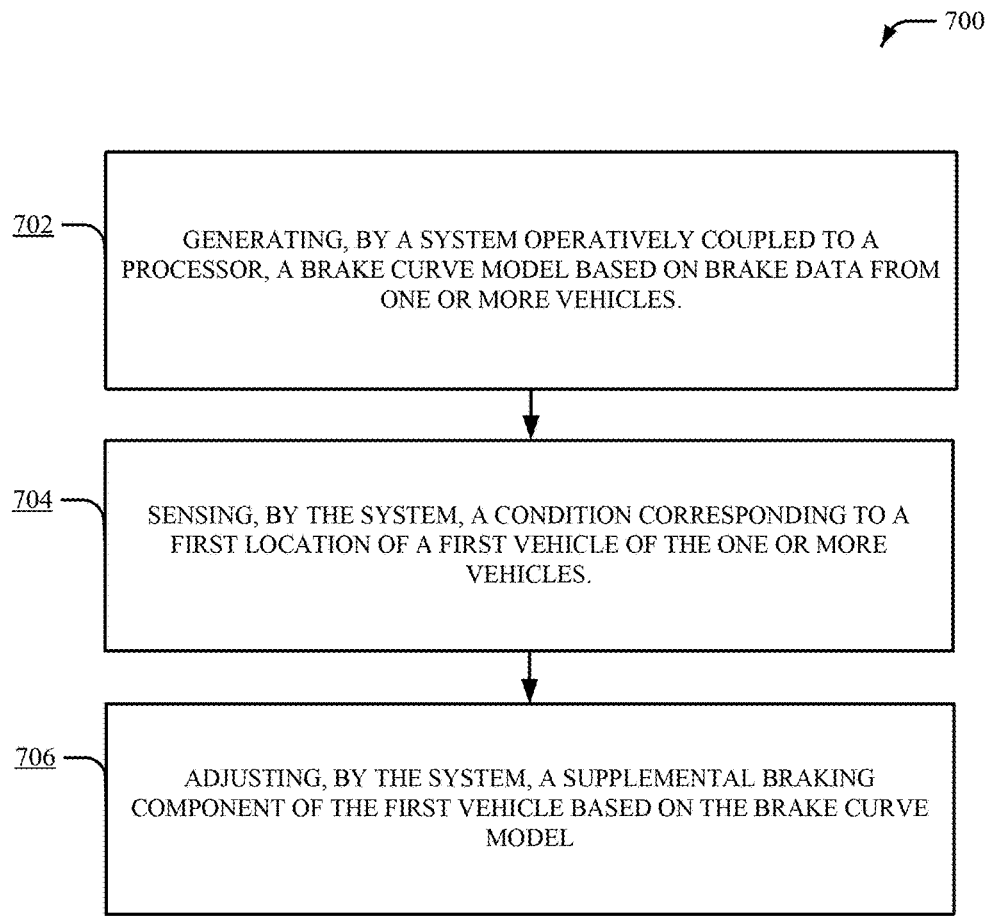
FIG. 7 illustrates a flow diagram of an example, non-limiting computer-implemented method that facilitates adjusting a supplemental braking component of a vehicle in accordance with one or more embodiments described herein.

FIG. 7 illustrates a flow diagram of an example, non-limiting computer-implemented method 700 that facilitates adjusting a supplemental braking component of a vehicle in accordance with one or more embodiments described herein. In an aspect, method 700 that can facilitate an adaptation of a personalized braking system to a variety of vehicles in order to replicate a braking experience in a range of vehicles for a user in accordance with one or more embodiments described herein. Repetitive description of like elements employed in other embodiments described herein are omitted for sake of brevity. As depicted, in step 702, a system operatively coupled to a processor (e.g., processor 112) can generate (e.g., using learning component 110) a brake curve model based on brake data from one or more vehicles. In step 704, the system can sense (e.g., using sensing component 120) a condition corresponding to a first location of a first vehicle of the one or more vehicles. In step 706, the system can adjust (e.g., using adjustment component 130) a supplemental braking component 114 of the first vehicle based on the brake curve model.

Figure 8:
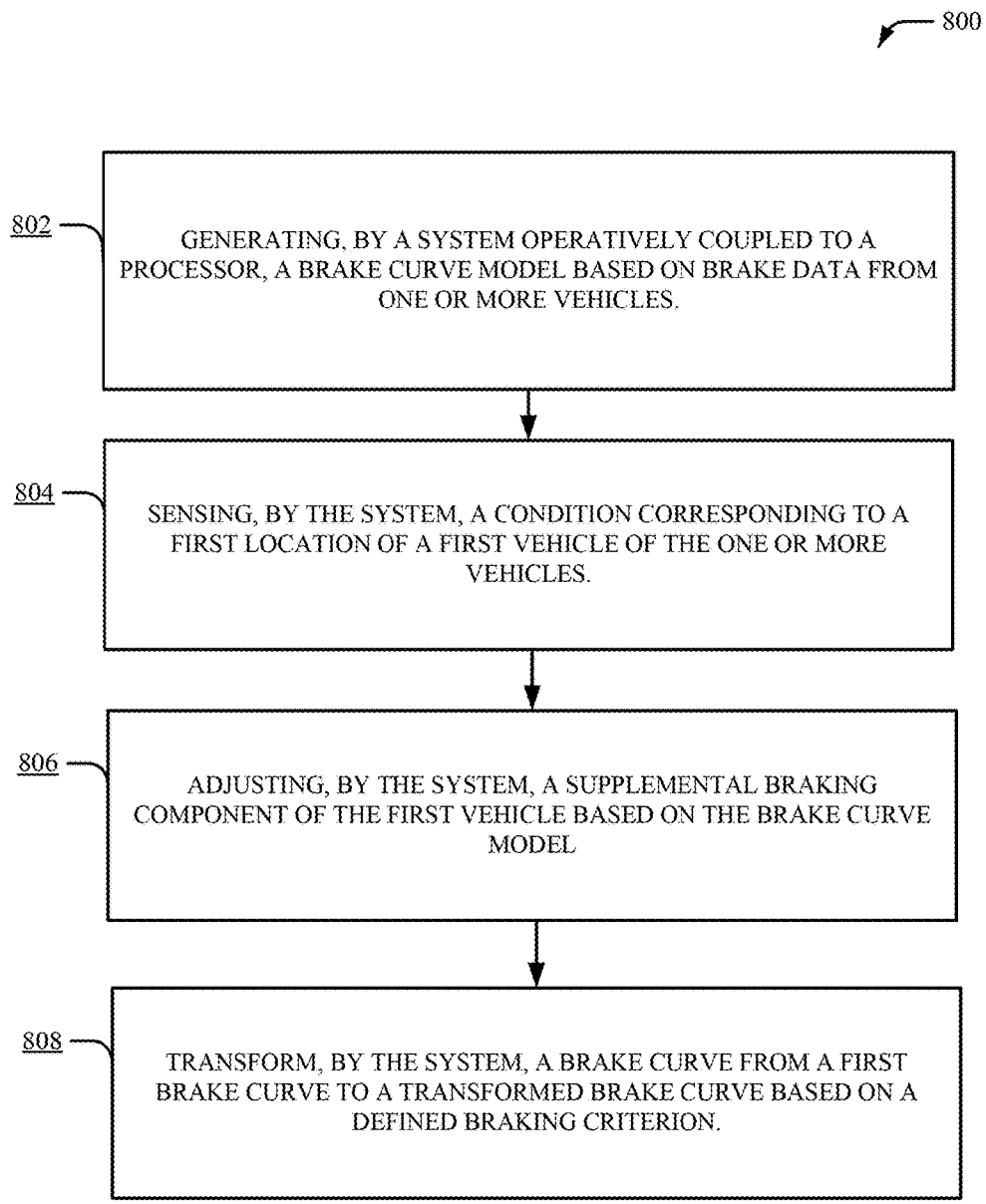
FIG. 8 illustrates a flow diagram of an example, non-limiting computer-implemented method that facilitates adjusting a brake pedal characteristic of a vehicle based on a braking curve model in accordance with one or more embodiments described herein.

FIG. 8 illustrates a flow diagram of an example, non-limiting computer-implemented method 800 that facilitates adjusting a brake pedal characteristic of a vehicle based on a braking curve model in accordance with one or more embodiments described herein. Repetitive description of like elements employed in other embodiments described herein are omitted for sake of brevity. As depicted, in step 802, a system operatively coupled to a processor (e.g., processor 112) can generate (e.g., using learning component 110) a brake curve model based on brake data from one or more vehicles. In step 804, the system can sense (e.g., using sensing component 120) a condition corresponding to a first location of a first vehicle of the one or more vehicles. In step 806, the system can adjust (e.g., using adjustment component 130) a supplemental braking component 114 of the first vehicle based on the brake curve model. In step 808, the system can transform (e.g., using transformation component 210) a brake curve from a first brake curve to a transformed brake curve based on a defined braking criterion.

Figure 9:
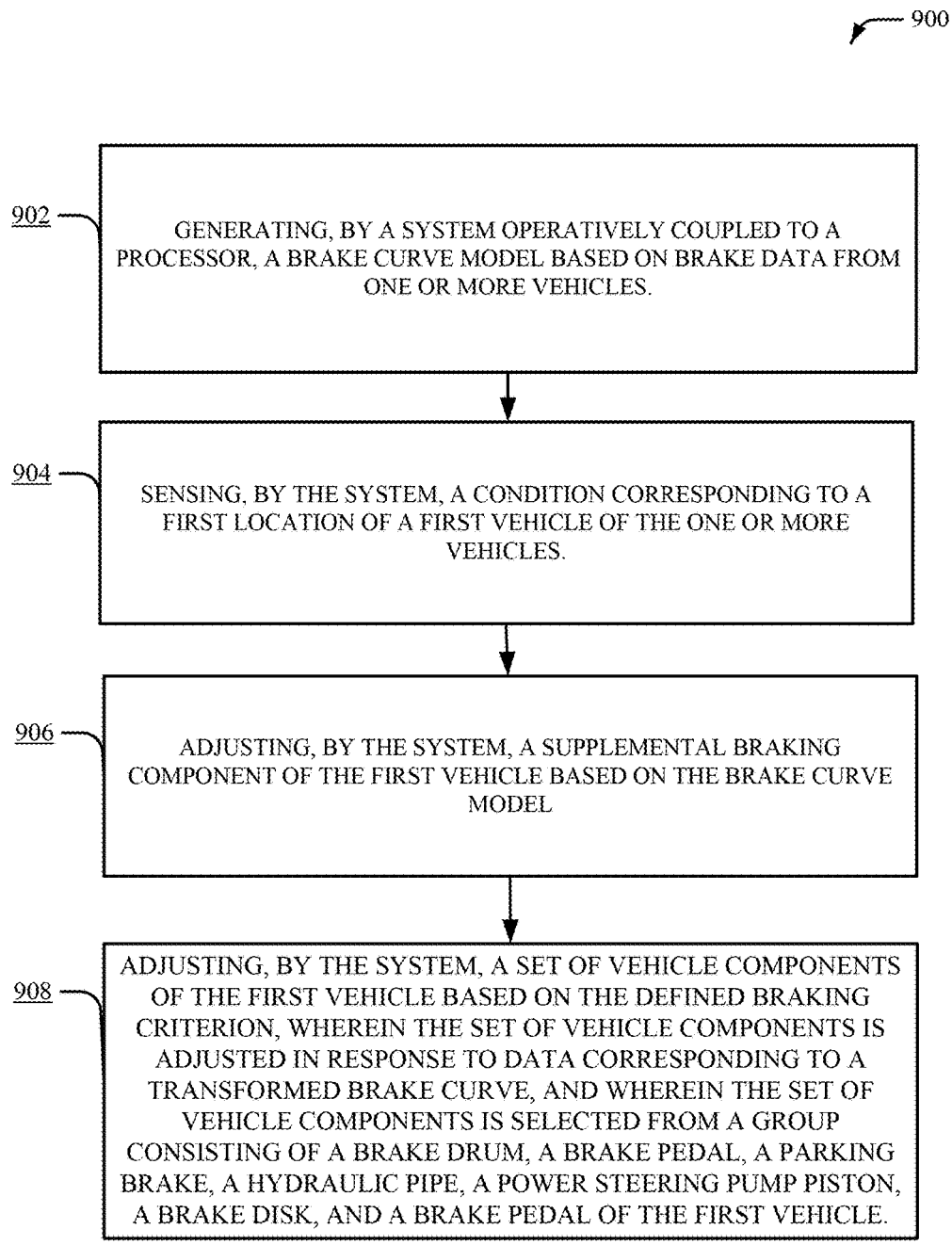
FIG. 9 illustrates a flow diagram of an example, non-limiting computer-implemented method that facilitates adjusting a brake pedal pressure amount based on a learned usage pattern in of one or more brake pedals in accordance with one or more embodiments described herein.

FIG. 9 illustrates a flow diagram of an example, non-limiting computer-implemented method 900 that facilitates adjusting a brake pedal pressure amount based on a learned usage pattern in of one or more brake pedals in accordance with one or more embodiments described herein. Repetitive description of like elements employed in other embodiments described herein are omitted for sake of brevity.

Figure 10:
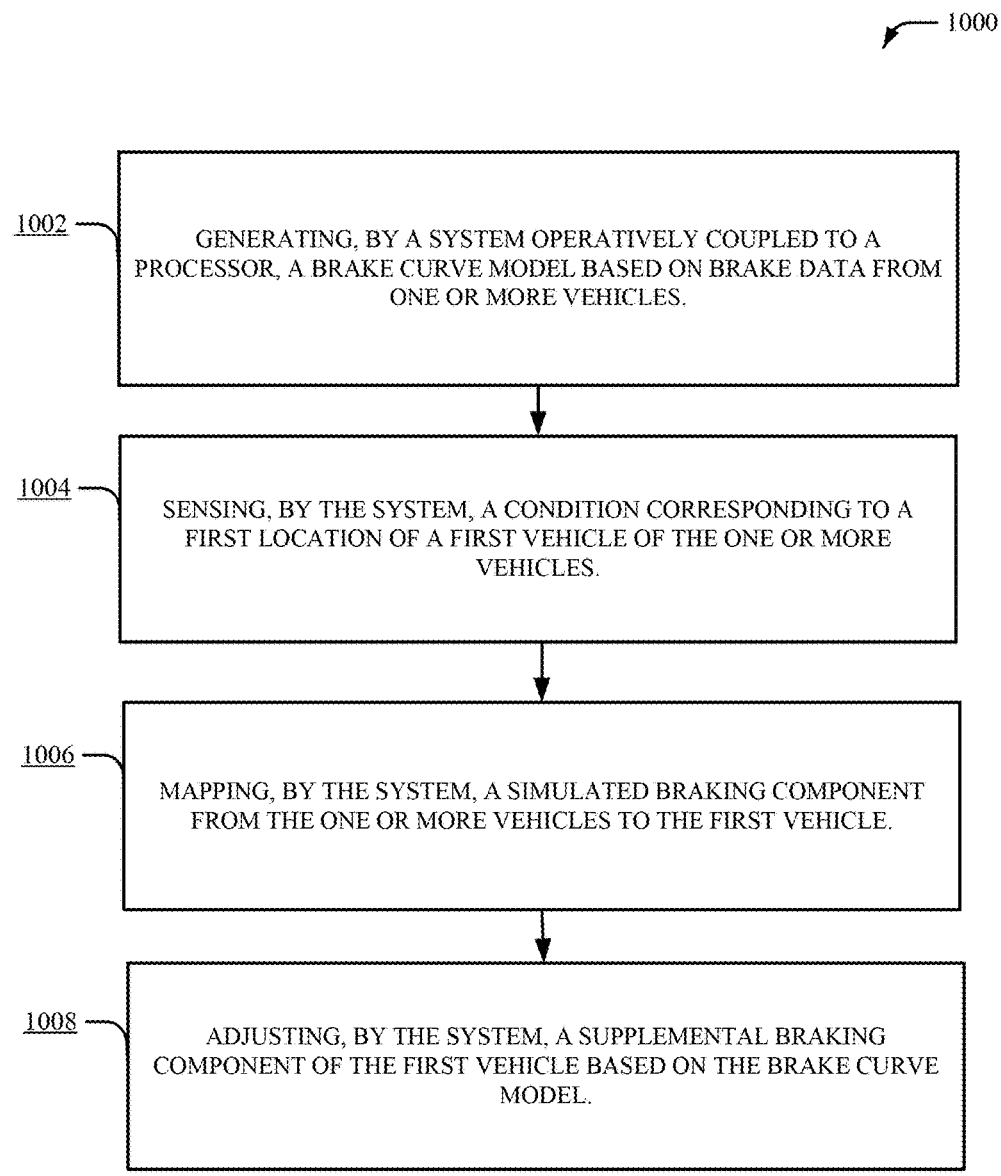
FIG. 10 illustrates a flow diagram of an example, non-limiting computer-implemented method that facilitates mapping simulation braking data from a first to a second vehicle in accordance with one or more embodiments described herein.

As depicted, in step 902, a system operatively coupled to a processor (e.g., processor 112) can generate (e.g., using learning component 110) a brake curve model based on brake data from one or more vehicles. In step 904, the system can sense (e.g., using sensing component 120) a condition corresponding to a first location of a first vehicle of the one or more vehicles. In step 906, the system can adjust (e.g., using adjustment component 130) a supplemental braking component 114 of the first vehicle based on the brake curve model. In step 908, the system can adjust (e.g., using brake control component 310) a set of vehicle components of the first vehicle based on the defined braking criterion, wherein the set of vehicle components is adjusted in response to data corresponding to a transformed brake curve, and wherein the set of vehicle components is selected from a group consisting of a brake drum, a brake pedal, a parking brake, a hydraulic pipe, a power steering pump piston, a brake disk, and a brake pedal of the first vehicle FIG. 10 illustrates a flow diagram of an example, non-limiting computer-implemented method 1000 that facilitates mapping simulation braking data from a first to a second vehicle in accordance with one or more embodiments described herein. Repetitive description of like elements employed in other embodiments described herein are omitted for sake of brevity.

As depicted, in step 1002, a system operatively coupled to a processor (e.g., processor 112) can generate (e.g., using learning component 110) a brake curve model based on brake data from one or more vehicles. In step 1004, the system can sense (e.g., using sensing component 120) a condition corresponding to a first location of a first vehicle of the one or more vehicles. In step 1006, the system can map (e.g., using mapping component 510) a simulated braking component from the one or more vehicles to the first vehicle. In step 1008, the system can adjust (e.g., using adjustment component 130) a supplemental braking component 114 of the first vehicle based on the brake curve model.

Figure 11:
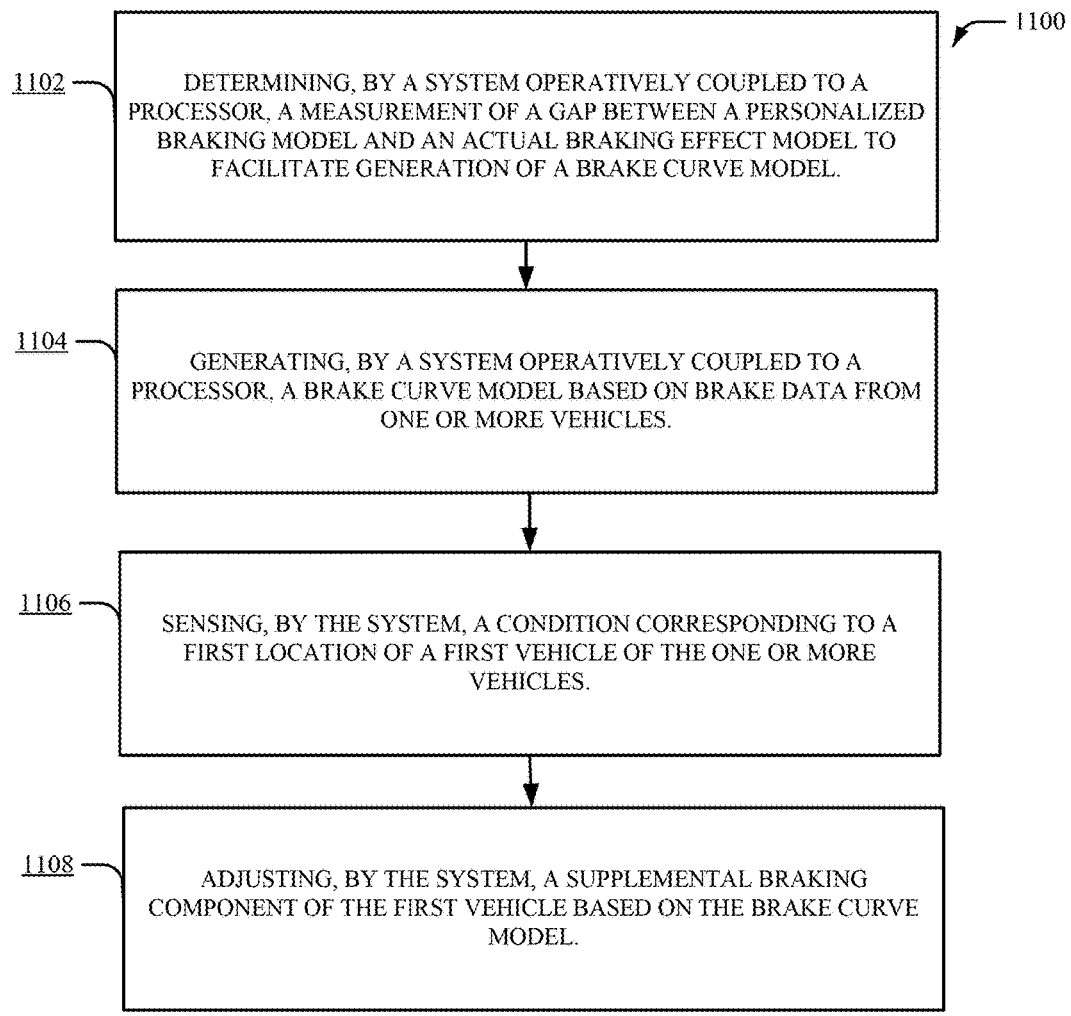
FIG. 11 illustrates a flow diagram of an example, non-limiting computer-implemented method that facilitates calibrating a braking curve model in accordance with one or more embodiments described herein.

FIG. 11 illustrates a flow diagram of an example, non-limiting computer-implemented method 1100 that facilitates calibrating a braking curve model in accordance with one or more embodiments described herein. Repetitive description of like elements employed in other embodiments described herein are omitted for sake of brevity.

As depicted, in step 1102, a system operatively coupled to a processor (e.g., processor 112) can determine (e.g., using determination component 610) a measurement of a gap between a personalized braking model and an actual braking effect model to facilitate generation of a brake curve model. As depicted, in step 1104, a system operatively coupled to a processor (e.g., processor 112) can generate (e.g., using learning component 110) a brake curve model based on brake data from one or more vehicles. In step 1106, the system can sense (e.g., using sensing component 120) a condition corresponding to a first location of a first vehicle of the one or more vehicles. In step 1108, the system can map (e.g., using mapping component 510) a simulated braking component from the one or more vehicles to the first vehicle. In step 1110, the system can adjust (e.g., using adjustment component 130) a supplemental braking component 114 of the first vehicle based on the brake curve model.

For simplicity of explanation, the computer-implemented methodologies are depicted and described as a series of acts. It is to be understood and appreciated that the subject innovation is not limited by the acts illustrated and/or by the order of acts, for example acts can occur in various orders and/or concurrently, and with other acts not presented and described herein. Furthermore, not all illustrated acts can be required to implement the computer-implemented methodologies in accordance with the disclosed subject matter. In addition, those skilled in the art can understand and appreciate that the computer-implemented methodologies could alternatively be represented as a series of interrelated states via a state diagram or events. Additionally, it should be further appreciated that the computer-implemented methodologies disclosed hereinafter and throughout this specification are capable of being stored on an article of manufacture to facilitate transporting and transferring such computer-implemented methodologies to computers. The term article of manufacture, as used herein, is intended to encompass a computer program accessible from any computer-readable device or storage media.

Moreover, because simulation of a first vehicle braking system in a second vehicle braking system is performed by components executed by a processor (e.g., processor 112) established from a combination of electrical and mechanical components and circuitry, a human is unable to replicate or perform the subject data packet configuration and/or the subject communication between processing components and/or a determination component. Furthermore, vehicle data associated with the first braking system is generated, transformed, and mapped to a second vehicle braking system. The access to such vehicle data is accessed from a memory (e.g., using memory 108) where such access patterns a human are unable to replicate.

Also, the systems and methods disclosed herein can be integrated with the tangible and physical braking system of various vehicles such as a supplemental braking component 114, a hydraulic pressure pump, a brake pedal, and other such physical vehicle components. Furthermore, the simulation of a braking system from one vehicle into another vehicle cannot be performed by a human. For example, a human is unable to generate learned data from a first vehicle, learn a personalized braking preference of one or more users, accurately and precisely sense environmental conditions, and implement a brake model curve that simulates the brake model curve of a first vehicle in a second vehicle to result in an adaptation of a second vehicle braking system. Furthermore, a human is unable to communicate similarity data and/or packetized data for communication between a main processor (e.g., using processor 118) and a memory (e.g., memory 108).

Figure 12:
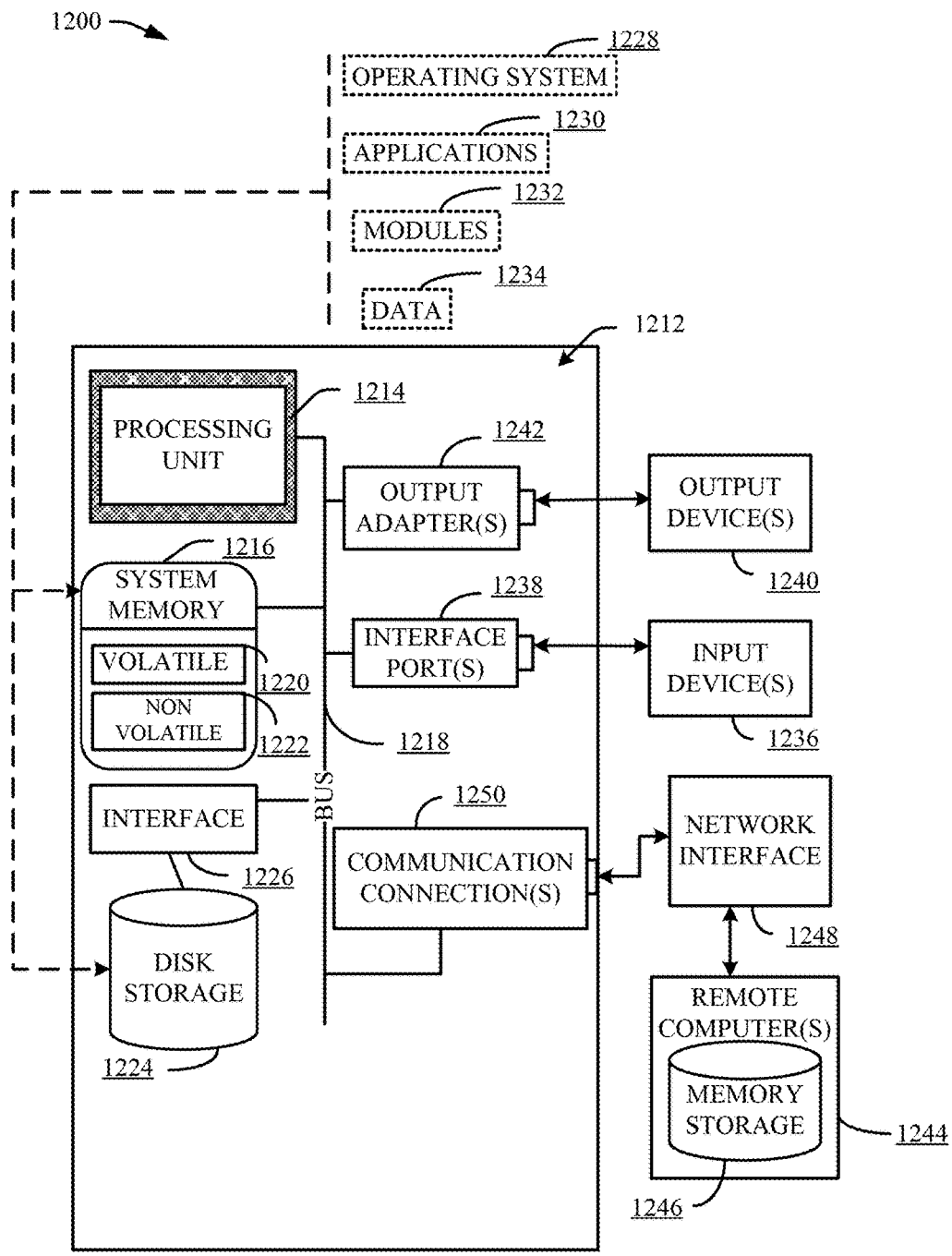
FIG. 12 illustrates a block diagram of an example, non-limiting operating environment in which one or more embodiments described herein can be facilitated.

In order to provide a context for the various aspects of the disclosed subject matter, FIG. 12 as well as the following discussion is intended to provide a general description of a suitable environment in which the various aspects of the disclosed subject matter can be implemented.

Turning now to FIG. 12, illustrated is a block diagram of an example, non-limiting operating environment 1200 in which one or more embodiments described herein can be facilitated. Repetitive description of like elements employed in other embodiments described herein are omitted for sake of brevity. With reference now to FIG. 12, a suitable operating environment 1200 for implementing various aspects of this disclosure can also include a computer 1212. The computer 1212 can also include a processing unit 1214, a system memory 1216, and a system bus 1218. The system bus 1218 couples system components including, but not limited to, the system memory 1216 to the processing unit 1214. The processing unit 1214 can be any of various available processors. Dual microprocessors and other multiprocessor architectures also can be employed as the processing unit 1214. The system bus 1218 can be any of several types of bus structure(s) including the memory bus or memory controller, a peripheral bus or external bus, and/or a local bus using any variety of available bus architectures including, but not limited to, Industrial Standard Architecture (ISA), Micro-Channel Architecture (MSA), Extended ISA (EISA), Intelligent Drive Electronics (IDE), VESA Local Bus (VLB), Peripheral Component Interconnect (PCI), Card Bus, Universal Serial Bus (USB), Advanced Graphics Port (AGP), Firewire (IEEE 1394), and Small Computer Systems Interface (SCSI).

The system memory 1216 can also include volatile memory 1220 and nonvolatile memory 1222. The basic input/output system (BIOS), containing the basic routines to transfer information between elements within the computer 1212, such as during start-up, is stored in nonvolatile memory 1222. By way of illustration, and not limitation, nonvolatile memory 1222 can include read only memory (ROM), programmable ROM (PROM), electrically programmable ROM (EPROM), electrically erasable programmable ROM (EEPROM), flash memory, or nonvolatile random access memory (RAM) (e.g., ferroelectric RAM (FeRAM). Volatile memory 1220 can also include random access memory (RAM), which acts as external cache memory. By way of illustration and not limitation, RAM is available in many forms such as static RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM.

Computer 1212 can also include removable/non-removable, volatile/non-volatile computer storage media for example, disk storage 1224. Disk storage 1224 can also include, but is not limited to, devices like a magnetic disk drive, floppy disk drive, tape drive, Jaz drive, Zip drive, LS-100 drive, flash memory card, or memory stick. The disk storage 1224 also can include storage media separately or in combination with other storage media including, but not limited to, an optical disk drive such as a compact disk ROM device (CD-ROM), CD recordable drive (CD-R Drive), CD rewritable drive (CD-RW Drive) or a digital versatile disk ROM drive (DVD-ROM). To facilitate connection of the disk storage 1224 to the system bus 1218, a removable or non-removable interface is typically used, such as interface 1226. FIG. 12 also depicts software that acts as an intermediary between users and the basic computer resources described in the suitable operating environment 1200. Such software can also include, for example, an operating system 1228. Operating system 1228, which can be stored on disk storage 1224, acts to control and allocate resources of the computer 1212.

System applications 1230 take advantage of the management of resources by operating system 1228 through program modules 1232 and program data 1234, e.g., stored either in system memory 1216 or on disk storage 1224. In some embodiments, the invention can be embodied as one or more such program modules 1232 and/or distributed across one or more remote computers 1244. It is to be appreciated that this disclosure can be implemented with various operating systems or combinations of operating systems. A user enters commands or information into the computer 1212 through input device(s) 1236. Input devices 1236 include, but are not limited to, a pointing device such as a mouse, trackball, stylus, touch pad, keyboard, microphone, joystick, game pad, satellite dish, scanner, TV tuner card, digital camera, digital video camera, web camera, and the like. These and other input devices connect to the processing unit 1214 through the system bus 1218 via interface port(s) 1238. Interface port(s) 1238 include, for example, a serial port, a parallel port, a game port, and a universal serial bus (USB). Output device(s) 1240 use some of the same type of ports as input device(s) 1236. Thus, for example, a USB port can be used to provide input to computer 1212, and to output information from computer 1212 to an output device 1240. Output adapter 1242 is provided to illustrate that there are some output devices 1240 like monitors, speakers, and printers, among other output devices 1240, which require special adapters. The output adapters 1242 include, by way of illustration and not limitation, video and sound cards that provide a means of connection between the output device 1240 and the system bus 1218. It should be noted that other devices and/or systems of devices provide both input and output capabilities such as remote computer(s) 1244.

Computer 1212 can operate in a networked environment using logical connections to one or more remote computers, such as remote computer(s) 1244. The remote computer(s) 1244 can be a computer, a server, a router, a network PC, a workstation, a microprocessor based appliance, a peer device or other common network node and the like, and typically can also include many or all of the elements described relative to computer 1212. For purposes of brevity, only a memory storage device 1246 is illustrated with remote computer(s) 1244. Remote computer(s) 1244 is logically connected to computer 1212 through a network interface 1248 and then physically connected via communication connection 1250. Network interface 1248 encompasses wire and/or wireless communication networks such as local-area networks (LAN), wide-area networks (WAN), cellular networks, etc. LAN technologies include Fiber Distributed Data Interface (FDDI), Copper Distributed Data Interface (CDDI), Ethernet, Token Ring and the like. WAN technologies include, but are not limited to, point-to-point links, circuit switching networks like Integrated Services Digital Networks (ISDN) and variations thereon, packet switching networks, and Digital Subscriber Lines (DSL). Communication connection(s) 1250 refers to the hardware/software employed to connect the network interface 1248 to the system bus 1218. While communication connection 1250 is shown for illustrative clarity inside computer 1212, it can also be external to computer 1212. The hardware/software for connection to the network interface 1248 can also include, for exemplary purposes only, internal and external technologies such as, modems including regular telephone grade modems, cable modems and DSL modems, ISDN adapters, and Ethernet cards.

The present disclosure may be a system, a method, an apparatus and/or a computer program product at any possible technical detail level of integration. The computer program product can include a computer readable storage medium (or media) having computer readable program instructions thereon for causing a processor to carry out aspects of the present disclosure. The computer readable storage medium can be a tangible device that can retain and store instructions for use by an instruction execution device. The computer readable storage medium can be, for example, but is not limited to, an electronic storage device, a magnetic storage device, an optical storage device, an electromagnetic storage device, a semiconductor storage device, or any suitable combination of the foregoing. A non-exhaustive list of more specific examples of the computer readable storage medium can also include the following: a portable computer diskette, a hard disk, a random access memory (RAM), a read-only memory (ROM), an erasable programmable read-only memory (EPROM or Flash memory), a static random access memory (SRAM), a portable compact disc read-only memory (CD-ROM), a digital versatile disk (DVD), a memory stick, a floppy disk, a mechanically encoded device such as punch-cards or raised structures in a groove having instructions recorded thereon, and any suitable combination of the foregoing. A computer readable storage medium, as used herein, is not to be construed as being transitory signals per se, such as radio waves or other freely propagating electromagnetic waves, electromagnetic waves propagating through a waveguide or other transmission media (e.g., light pulses passing through a fiber-optic cable), or electrical signals transmitted through a wire.

Computer readable program instructions described herein can be downloaded to respective computing/processing devices from a computer readable storage medium or to an external computer or external storage device via a network, for example, the Internet, a local area network, a wide area network and/or a wireless network. The network can comprise copper transmission cables, optical transmission fibers, wireless transmission, routers, firewalls, switches, gateway computers and/or edge servers. A network adapter card or network interface in each computing/processing device receives computer readable program instructions from the network and forwards the computer readable program instructions for storage in a computer readable storage medium within the respective computing/processing device. Computer readable program instructions for carrying out operations of the present disclosure can be assembler instructions, instruction-set-architecture (ISA) instructions, machine instructions, machine dependent instructions, microcode, firmware instructions, state-setting data, configuration data for integrated circuitry, or either source code or object code written in any combination of one or more programming languages, including an object oriented programming language such as Smalltalk, C++, or the like, and procedural programming languages, such as the "C" programming language or similar programming languages. The computer readable program instructions can execute entirely on the user's computer, partly on the user's computer, as a stand-alone software package, partly on the user's computer and partly on a remote computer or entirely on the remote computer or server. In the latter scenario, the remote computer can be connected to the user's computer through any type of network, including a local area network (LAN) or a wide area network (WAN), or the connection can be made to an external computer (for example, through the Internet using an Internet Service Provider). In some embodiments, electronic circuitry including, for example, programmable logic circuitry, field-programmable gate arrays (FPGA), or programmable logic arrays (PLA) can execute the computer readable program instructions by utilizing state information of the computer readable program instructions to personalize the electronic circuitry, in order to perform aspects of the present disclosure.

Aspects of the present disclosure are described herein with reference to flowchart illustrations and/or block diagrams of methods, apparatus (systems), and computer program products according to embodiments of the disclosure. It will be understood that each block of the flowchart illustrations and/or block diagrams, and combinations of blocks in the flowchart illustrations and/or block diagrams, can be implemented by computer readable program instructions. These computer readable program instructions can be provided to a processor of a general purpose computer, special purpose computer, or other programmable data processing apparatus to produce a machine, such that the instructions, which execute via the processor of the computer or other programmable data processing apparatus, create means for implementing the functions/acts specified in the flowchart and/or block diagram block or blocks. These computer readable program instructions can also be stored in a computer readable storage medium that can direct a computer, a programmable data processing apparatus, and/or other devices to function in a particular manner, such that the computer readable storage medium having instructions stored therein comprises an article of manufacture including instructions which implement aspects of the function/act specified in the flowchart and/or block diagram block or blocks. The computer readable program instructions can also be loaded onto a computer, other programmable data processing apparatus, or other device to cause a series of operational acts to be performed on the computer, other programmable apparatus or other device to produce a computer implemented process, such that the instructions which execute on the computer, other programmable apparatus, or other device implement the functions/acts specified in the flowchart and/or block diagram block or blocks.

The flowchart and block diagrams in the Figures illustrate the architecture, functionality, and operation of possible implementations of systems, methods, and computer program products according to various embodiments of the present disclosure. In this regard, each block in the flowchart or block diagrams can represent a module, segment, or portion of instructions, which comprises one or more executable instructions for implementing the specified logical function(s). In some alternative implementations, the functions noted in the blocks can occur out of the order noted in the Figures. For example, two blocks shown in succession can, in fact, be executed substantially concurrently, or the blocks can sometimes be executed in the reverse order, depending upon the functionality involved. It will also be noted that each block of the block diagrams and/or flowchart illustration, and combinations of blocks in the block diagrams and/or flowchart illustration, can be implemented by special purpose hardware-based systems that perform the specified functions or acts or carry out combinations of special purpose hardware and computer instructions.

While the subject matter has been described above in the general context of computer-executable instructions of a computer program product that runs on a computer and/or computers, those skilled in the art will recognize that this disclosure also can or can be implemented in combination with other program modules. Generally, program modules include routines, programs, components, data structures, etc. that perform particular tasks and/or implement particular abstract data types. Moreover, those skilled in the art will appreciate that the inventive computer-implemented methods can be practiced with other computer system configurations, including single-processor or multiprocessor computer systems, mini-computing devices, mainframe computers, as well as computers, hand-held computing devices (e.g., PDA, phone), microprocessor-based or programmable consumer or industrial electronics, and the like. The illustrated aspects can also be practiced in distributed computing environments in which tasks are performed by remote processing devices that are linked through a communications network. However, some, if not all aspects of this disclosure can be practiced on stand-alone computers. In a distributed computing environment, program modules can be located in both local and remote memory storage devices.

As used in this application, the terms "component," "system," "platform," "interface," and the like, can refer to and/or can include a computer-related entity or an entity related to an operational machine with one or more specific functionalities. The entities disclosed herein can be either hardware, a combination of hardware and software, software, or software in execution. For example, a component can be, but is not limited to being, a process running on a processor, a processor, an object, an executable, a thread of execution, a program, and/or a computer. By way of illustration, both an application running on a server and the server can be a component. One or more components can reside within a process and/or thread of execution and a component can be localized on one computer and/or distributed between two or more computers. In another example, respective components can execute from various computer readable media having various data structures stored thereon. The components can communicate via local and/or remote processes such as in accordance with a signal having one or more data packets (e.g., data from one component interacting with another component in a local system, distributed system, and/or across a network such as the Internet with other systems via the signal). As another example, a component can be an apparatus with specific functionality provided by mechanical parts operated by electric or electronic circuitry, which is operated by a software or firmware application executed by a processor. In such a case, the processor can be internal or external to the apparatus and can execute at least a part of the software or firmware application. As yet another example, a component can be an apparatus that provides specific functionality through electronic components without mechanical parts, wherein the electronic components can include a processor or other means to execute software or firmware that confers at least in part the functionality of the electronic components. In an aspect, a component can emulate an electronic component via a virtual machine, e.g., within a cloud computing system.

In addition, the term "or" is intended to mean an inclusive "or" rather than an exclusive "or." That is, unless specified otherwise, or clear from context, "X employs A or B" is intended to mean any of the natural inclusive permutations. That is, if X employs A; X employs B; or X employs both A and B, then "X employs A or B" is satisfied under any of the foregoing instances. Moreover, articles "a" and "an" as used in the subject specification and annexed drawings should generally be construed to mean "one or more" unless specified otherwise or clear from context to be directed to a singular form. As used herein, the terms "example" and/or "exemplary" are utilized to mean serving as an example, instance, or illustration. For the avoidance of doubt, the subject matter disclosed herein is not limited by such examples. In addition, any aspect or design described herein as an "example" and/or "exemplary" is not necessarily to be construed as preferred or advantageous over other aspects or designs, nor is it meant to preclude equivalent exemplary structures and techniques known to those of ordinary skill in the art.

As it is employed in the subject specification, the term "processor" can refer to substantially any computing processing unit or device comprising, but not limited to, single-core processors; single-processors with software multithread execution capability; multi-core processors; multi-core processors with software multithread execution capability; multi-core processors with hardware multithread technology; parallel platforms; and parallel platforms with distributed shared memory. Additionally, a processor can refer to an integrated circuit, an application specific integrated circuit (ASIC), a digital signal processor (DSP), a field programmable gate array (FPGA), a programmable logic controller (PLC), a complex programmable logic device (CPLD), a discrete gate or transistor logic, discrete hardware components, or any combination thereof designed to perform the functions described herein. Further, processors can exploit nano-scale architectures such as, but not limited to, molecular and quantum-dot based transistors, switches and gates, in order to optimize space usage or enhance performance of user equipment. A processor can also be implemented as a combination of computing processing units. In this disclosure, terms such as "store," "storage," "data store," data storage," "database," and substantially any other information storage component relevant to operation and functionality of a component are utilized to refer to "memory components," entities embodied in a "memory," or components comprising a memory. It is to be appreciated that memory and/or memory components described herein can be either volatile memory or nonvolatile memory, or can include both volatile and nonvolatile memory. By way of illustration, and not limitation, nonvolatile memory can include read only memory (ROM), programmable ROM (PROM), electrically programmable ROM (EPROM), electrically erasable ROM (EEPROM), flash memory, or nonvolatile random access memory (RAM) (e.g., ferroelectric RAM (FeRAM). Volatile memory can include RAM, which can act as external cache memory, for example. By way of illustration and not limitation, RAM is available in many forms such as synchronous RAM (SRAM), dynamic RAM (DRAM), synchronous DRAM (SDRAM), double data rate SDRAM (DDR SDRAM), enhanced SDRAM (ESDRAM), Synchlink DRAM (SLDRAM), direct Rambus RAM (DRRAM), direct Rambus dynamic RAM (DRDRAM), and Rambus dynamic RAM (RDRAM). Additionally, the disclosed memory components of systems or computer-implemented methods herein are intended to include, without being limited to including, these and any other suitable types of memory.

What has been described above include mere examples of systems and computer-implemented methods. It is, of course, not possible to describe every conceivable combination of components or computer-implemented methods for purposes of describing this disclosure, but one of ordinary skill in the art can recognize that many further combinations and permutations of this disclosure are possible. Furthermore, to the extent that the terms "includes," "has," "possesses," and the like are used in the detailed description, claims, appendices and drawings such terms are intended to be inclusive in a manner similar to the term "comprising" as "comprising" is interpreted when employed as a transitional word in a claim.

The descriptions of the various embodiments have been presented for purposes of illustration, but are not intended to be exhaustive or limited to the embodiments disclosed. Many modifications and variations will be apparent to those of ordinary skill in the art without departing from the scope and spirit of the described embodiments. The terminology used herein was chosen to best explain the principles of the embodiments, the practical application or technical improvement over technologies found in the marketplace, or to enable others of ordinary skill in the art to understand the embodiments disclosed herein.

What is claimed is:

1. A system comprising:
   a memory that stores computer executable components;
   a processor operably coupled to the memory and that executes the computer executable components stored in the memory, wherein the computer executable components comprise:
   a learning component that generates a brake curve based on brake data from one or more vehicles;
   a transformation component that transforms the brake curve to a transformed brake curve based on a defined braking criterion;
   a sensing component that senses a condition corresponding to a first location of a first vehicle of the one or more vehicles; and
   an adjustment component that adjusts at least one supplemental braking component of the first vehicle based on the transformed brake curve, the condition, and defined braking criterion, wherein the at least one supplemental braking component is selected from a group consisting of a brake drum, a parking brake, a hydraulic pipe, a power steering pump piston, a brake disk, and a brake pedal of the first vehicle.

2. The system of claim 1, wherein the transformed brake curve is a result of application of the defined braking criterion to the braking curve.

3. The system of claim 1, wherein the condition is an environmental condition and the defined braking criterion comprises the environmental condition associated with the first location of the first vehicle.

4. The system of claim 3, wherein the environmental condition is selected from a group consisting of a road condition, a weather condition and a first vehicle operational condition.

5. The system of claim 1, further comprising a hydraulic pressure component coupled to a brake panel element of the first vehicle and that adjusts at least one force setting of the brake pedal of the first vehicle.

6. The system of claim 5, wherein a first force setting of the at least one force setting corresponds to a defined brake pedal pressure measurement used to facilitate an engagement of the brake pedal.

7. The system of claim 6, wherein a second force setting of the at least one force setting corresponds to a braking pedal angular velocity measurement from the brake data.

8. The system of claim 1, further comprising a mapping component that maps a simulated braking component from the one or more vehicles to the first vehicle.

9. The system of claim 1, wherein a first brake data of the brake data comprises a user brake usage pattern.

10. The system of claim 1, further comprising a determination component that determines a measurement of a gap between a personalized braking model and an actual braking effect model to facilitate generation of the brake curve.

11. A computer-implemented method, comprising:
generating, by a system operatively coupled to a processor, a brake curve based on brake data from one or more vehicles;
transforming, by the system, the brake curve to a transformed brake curve based on a defined braking criterion;
sensing, by the system, a condition corresponding to a first location of a first vehicle of the one or more vehicles; and
adjusting, by the system, at least one supplemental braking component of the first vehicle based on the transformed brake curve, the condition, and defined braking criterion, wherein the at least one supplemental braking component is selected from a group consisting of a brake drum, a parking brake, a hydraulic pipe, a power steering pump piston, a brake disk, and a brake pedal of the first vehicle.

12. The computer-implemented method of claim 11, further comprising mapping, by the system, a simulated braking component from the one or more vehicles to the first vehicle.

13. The computer-implemented method of claim 11, further comprising determining, by the system, a measurement of a gap between a personalized braking model and an actual braking effect model to facilitate generation of the brake curve.

14. The computer-implemented method of claim 11, wherein the adjusting of the at least one supplemental braking component comprises adjusting at least one force setting of the brake pedal of the first vehicle.

15. The computer-implemented method of claim 14, wherein a first force setting of the at least one force setting corresponds to a defined brake pedal pressure measurement used to facilitate an engagement of the brake pedal.

16. The computer-implemented method of claim 14, wherein a second force setting of the at least one force setting corresponds to a braking pedal angular velocity measurement from the brake data.

17. A computer program product for facilitating an automatic adjustment of a braking system, the computer program product comprising a computer readable storage medium having program instructions embodied therewith, the program instructions executable by a processor to cause the processor to:
generate a brake curve based on brake data from one or more vehicles;
transform the brake curve to a transformed brake curve based on a defined braking criterion;
sense a condition corresponding to a first location of a first vehicle of the one or more vehicles; and
adjust at least one supplemental braking component of the first vehicle based on the transformed brake curve, the condition, and defined braking criterion, wherein the at least one supplemental braking component is selected from a group consisting of a brake drum, a parking brake, a hydraulic pipe, a power steering pump piston, a brake disk, and a brake pedal of the first vehicle.

18. The computer program product of claim 17, wherein the adjustment of the at least one supplemental braking component comprises adjust at least one force setting of the brake pedal of the first vehicle.

19. The computer program product of claim 18, wherein a first force setting of the at least one force setting corresponds to a defined brake pedal pressure measurement used to facilitate an engagement of the brake pedal.

20. The computer program product of claim 18, wherein a second force setting of the at least one force setting corresponds to a braking pedal angular velocity.

* * * * *